(12) United States Patent
Mizutani et al.

(10) Patent No.: US 12,177,582 B2
(45) Date of Patent: Dec. 24, 2024

(54) DETECTOR AND DETECTION SYSTEM

(71) Applicant: CANON KABUSHIKI KAISHA, Tokyo (JP)

(72) Inventors: Fumiaki Mizutani, Kanagawa (JP); Takanori Watanabe, Kanagawa (JP); Hajime Ikeda, Kanagawa (JP); Zempei Wada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/452,218

(22) Filed: Aug. 18, 2023

(65) Prior Publication Data

US 2024/0073549 A1    Feb. 29, 2024

(30) Foreign Application Priority Data

Aug. 26, 2022  (JP) .................................. 2022-134559
May 16, 2023  (JP) .................................. 2023-080760

(51) Int. Cl.
*H04N 25/30* (2023.01)
*G01T 1/17* (2006.01)
*H04N 25/77* (2023.01)
*H04N 25/779* (2023.01)

(52) U.S. Cl.
CPC ............... *H04N 25/30* (2023.01); *G01T 1/17* (2013.01); *H04N 25/77* (2023.01); *H04N 25/779* (2023.01)

(58) Field of Classification Search
CPC ...... H04N 25/30; H04N 25/77; H04N 25/779; G01T 1/17
See application file for complete search history.

(56) References Cited

U.S. PATENT DOCUMENTS

| 2008/0218608 A1* | 9/2008 | Rossi ................ H01L 27/14609 348/E9.037 |
| 2016/0118424 A1* | 4/2016 | Guidash ................. H04N 25/75 257/231 |
| 2022/0171259 A1 | 6/2022 | Mizutani |
| 2023/0353899 A1* | 11/2023 | Funabashi ............. H01L 27/146 |

FOREIGN PATENT DOCUMENTS

| JP | 2016-39603 A | 3/2016 |
| JP | 2019-87640 A | 6/2019 |
| JP | 2020-53827 A | 4/2020 |

* cited by examiner

*Primary Examiner* — Thanh Luu
(74) *Attorney, Agent, or Firm* — VENABLE LLP

(57) ABSTRACT

A detector includes a unit cell array in which a plurality of unit cells are arranged. The plurality of unit cells include a first unit cell including a first conversion element and a first amplification transistor including a control electrode connected to the first conversion element, the first unit cell being configured to output a signal obtained by amplifying the signal charge by the first amplification transistor, and a second unit cell including a second amplification transistor including a control electrode connected to a constant voltage source, the second amplification transistor being configured to output a signal corresponding to a voltage of the constant voltage source by the second amplification transistor. The first unit cell and the second unit cell are disposed in an irradiated region in the unit cell array, the irradiated region being configured to be irradiated with the energy beam.

27 Claims, 12 Drawing Sheets

DETECTOR AND DETECTION SYSTEM

BACKGROUND OF THE INVENTION

Field of the Invention

The present disclosure relates to a detector that detects an electromagnetic wave or a particle beam, and a detection system including the detector.

Description of the Related Art

Light such as visible light and infrared light and radioactive rays such as X-ray can be detected by a detector having a pixel structure of a complementary-metal-oxide-semiconductor image sensor: CMOS image sensor. Japanese Patent Laid-Open No. 2019-87640 discloses a technique of improving the detection precision of an electromagnetic wave or a particle beam by defining the thickness of a semiconductor layer in a detection region of the detector. Japanese Patent Laid-Open No. 2020-53827 and Japanese Patent Laid-Open No. 2016-39603 disclose a technique of, in a detector that detects visible light, disposing a light-shielded pixel shielded by a light-shielding member around a region (opening region) that is irradiated with light in a pixel array, and correcting a pixel signal of a pixel in the opening region by using a pixel signal of the light-shielded pixel.

Pixels of a radiation detector may deteriorate over time due to the exposure to radiation, and the detection precision of the radiation may deteriorate. Even a light detector can deteriorate over time in a similar manner if the light detector is used in an environment in which the light detector is exposed to radiation.

However, in the configurations of Japanese Patent Laid-Open No. 2020-53827 and Japanese Patent Laid-Open No. 2016-39603, since the incident amount of the radiation differs between the pixels in the opening region and the light-shielded pixels, the time-related deterioration caused by the radiation progresses at a different speed. Therefore, in the method of using pixel signals of light-shielded pixels as in these documents, degradation of the detection precision or the like caused by the time-related deterioration resulting from radiation cannot be effectively suppressed.

SUMMARY OF THE INVENTION

According to an aspect of the disclosure, a detector includes a unit cell array in which a plurality of unit cells are arranged, wherein the plurality of unit cells include a first unit cell including a first conversion element configured to convert an incident energy beam into a signal charge and accumulate the signal charge, and a first amplification transistor including a control electrode connected to the first conversion element, the first unit cell being configured to output a signal obtained by amplifying the signal charge by the first amplification transistor, and a second unit cell including a second amplification transistor including a control electrode connected to a constant voltage source, the second amplification transistor being configured to output a signal corresponding to a voltage of the constant voltage source by the second amplification transistor, and wherein the first unit cell and the second unit cell are disposed in an irradiated region in the unit cell array, the irradiated region being configured to be irradiated with the energy beam.

According to another aspect of the disclosure, a detector includes a unit cell array in which a plurality of unit cells are arranged, wherein the plurality of unit cells include a first unit cell including a first conversion element configured to convert an incident energy beam into a signal charge and accumulate the signal charge, a first amplification transistor including a control electrode connected to the first conversion element, and a first reset transistor configured to reset a potential of the control electrode of the first amplification transistor, the first unit cell being configured to output a signal obtained by amplifying the signal charge by the first amplification transistor, and a second unit cell including a second amplification transistor and a second reset transistor connected to a control electrode of the second amplification transistor, the second unit cell being configured to output a signal corresponding to a potential of the control electrode of the second amplification transistor, wherein the detector further comprises: a first control line provided for a row of the unit cell array and connected to a control electrode of the first reset transistor; and a second control line provided parallel to the first control line and provided for the row including the second unit cell in the unit cell array, the second control line being connected to a control electrode of the second reset transistor and not connected to the control electrode of the first reset transistor, and wherein the first unit cell and the second unit cell are disposed in an irradiated region in the unit cell array, the irradiated region being configured to be irradiated with the energy beam.

According to another aspect of the disclosure, a detector includes a unit cell array in which a plurality of unit cells are arranged, wherein the plurality of unit cells include a first unit cell including a first conversion element configured to convert an incident energy beam into a signal charge and accumulate the signal charge, and a first amplification transistor including a control electrode connected to the first conversion element, the first unit cell being configured to output a signal obtained by amplifying the signal charge by the first amplification transistor, and a second unit cell including a second amplification transistor and configured to output a signal corresponding to a voltage applied to a control electrode of the second amplification transistor, wherein the first unit cell and the second unit cell are disposed in an irradiated region in the unit cell array, the irradiated region being configured to be irradiated with the energy beam, and wherein the detector is configured to detect change in a threshold voltage of the first amplification transistor on a basis of a difference between (i) an output signal of the second unit cell in a case where a constant voltage is applied to the control electrode of the second amplification transistor in a first state and (ii) an output signal of the second unit cell in a case where the constant voltage is applied to the control electrode of the second amplification transistor in a second state that is after the first state.

Further features of the present disclosure will become apparent from the following description of exemplary embodiments with reference to the attached drawings.

DESCRIPTION OF THE EMBODIMENTS

Embodiments of the present disclosure will be described below with reference to drawings.

Examples of "detector" according to the present disclosure include a photodetector that detects light such as visible light or infrared light, and a radiation detector that detects a radioactive ray. The radioactive ray that the radiation detector detects may be an ionizing radioactive ray such as an X-ray or gamma ray, or a particle beam such as an alpha ray, a beta ray, a neutron beam, a proton beam, an electron beam, a heavy ion beam, or a meson beam. In the present disclosure, ionizing radioactive rays and light and radiation of particle beams (electromagnetic waves other than the ionizing radioactive rays) that are detected by the detector will be collectively referred to as "energy beams".

First Embodiment

Figure 1:
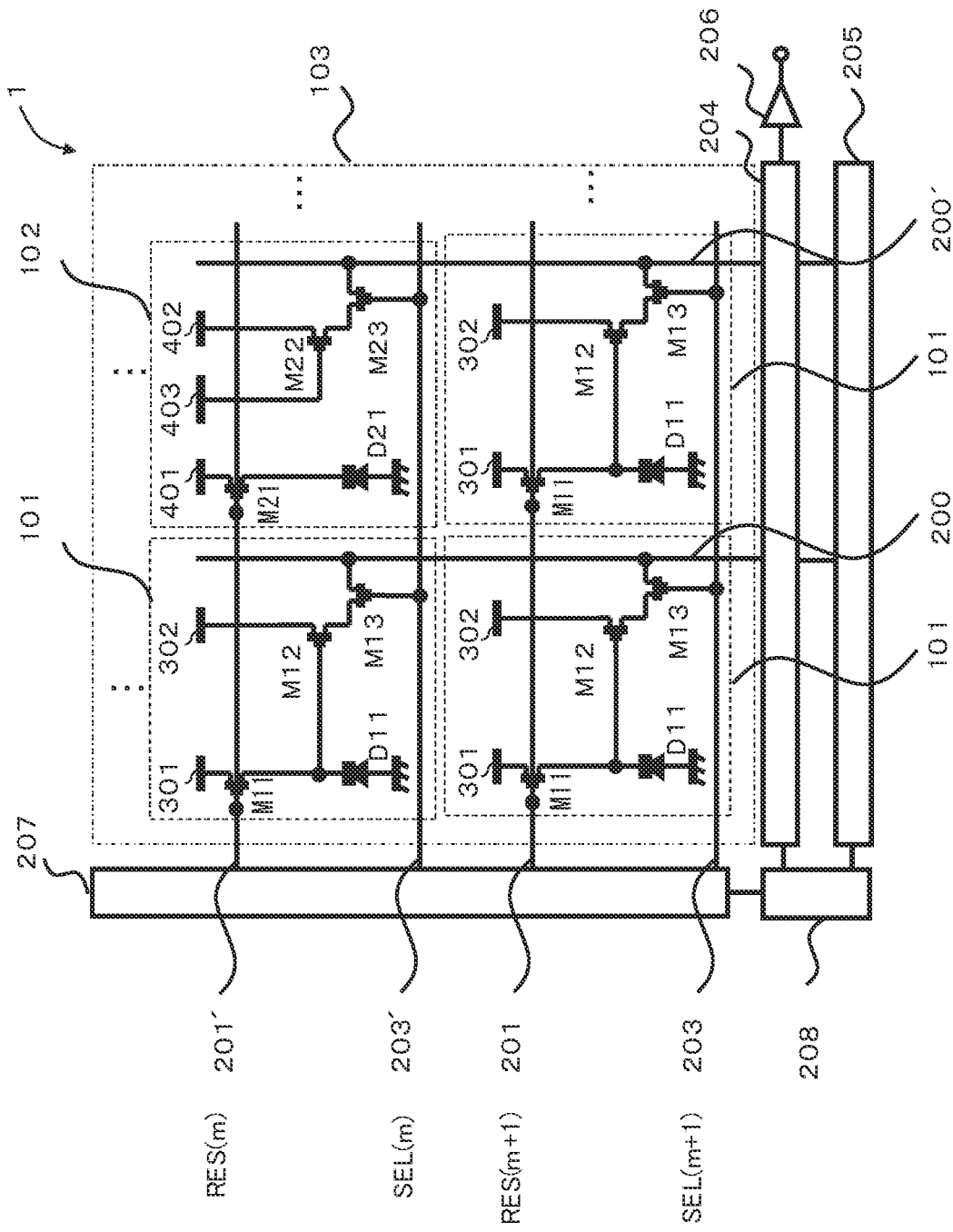
FIG. 1 is a circuit diagram of a detector according to first through third and fifth embodiments.
Figure 2:
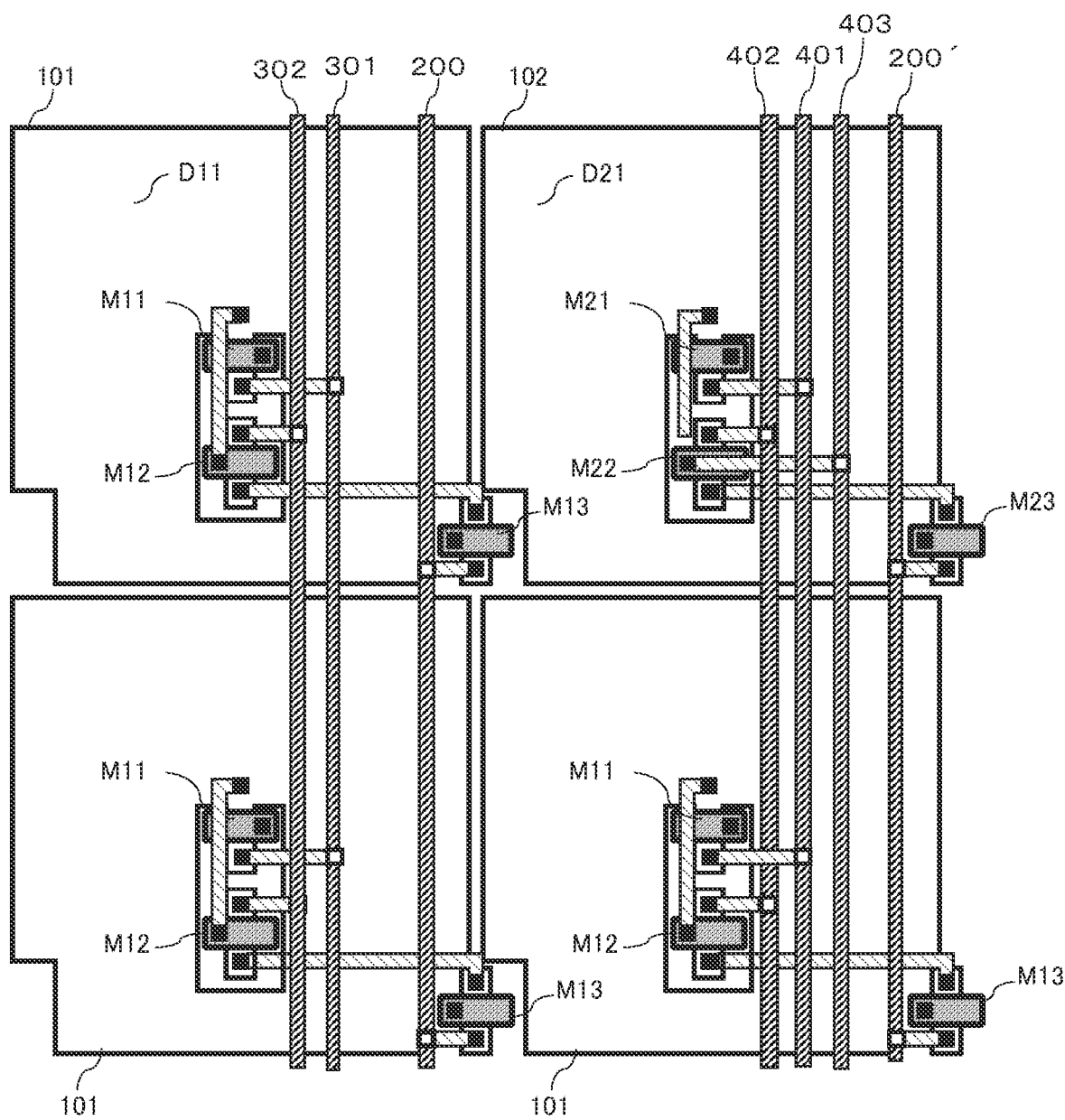
FIG. 2 is a diagram illustrating a wiring structure of pixels according to the first through third and fifth embodiments.

A radiation detector 1 serving as a detector according to a first embodiment will be described with reference to FIGS. 1 and 2. FIG. 1 is a circuit diagram of the radiation detector 1. FIG. 2 is a plan view illustrating a structure of unit cells in the present embodiment, for example, pixels. The radiation detector 1 is a radiation detector of a direct conversion type having a pixel structure of a CMOS image sensor. Although a case of capturing an image will be described below, a configuration in which the radiation detector only performs detection of a detection signal may be employed.

As a pixel structure of a CMOS image sensor, a direct connection type in which a detection diode and an amplification transistor are directly connected to each other, and a transfer type in which an electric charge accumulated in the detection diode is transferred to a gate electrode of the amplification transistor via a transfer transistor are known. Although the pixel structure of the radiation detector of the present embodiment is a direct connection type, the present technique is also applicable to a detector having a pixel structure of a transfer type.

The radiation detector 1 includes a pixel array 103 in which a plurality of unit pixel structures (hereinafter simply referred to as pixels) are arranged in an array shape, a vertical scanning circuit 207, a column circuit portion 204, a horizontal scanning circuit 205, an output circuit 206, and a control circuit 208.

The radiation detector 1 may be configured such that the radiation irradiates the entire region of the pixel array 103, or part of the pixel array 103 may be shielded from the radiation. In the description below, a region irradiated with the radiation in the pixel array 103 will be referred to as an irradiated region or an opening region, and a region not irradiated with the radiation in the pixel array 103 will be referred to as a non-irradiated region or a shielded region.

As illustrated in FIG. 1, the pixel array 103 is constituted by two kinds of pixels, which are effective pixels 101 and deterioration detection pixels 102. Arbitrary one of the effective pixels 101 serves as an example of a "first pixel", and an arbitrary one of the deterioration detection pixels 102 serves as an example of a "second pixel". As described above, in the case where a pixel is expressed as a unit cell, it can be also said that arbitrary one of unit cells 101 serves as an example of a "first unit cell", and an arbitrary one of unit cells 102 for deterioration detection serves as an example of a "second unit cell". The pixel array 103 serving as a unit cell array includes a first pixel group (first unit cell group) constituted by pixels having the same pixel structure (unit cell structure) as the first pixel, and a second pixel group (second unit cell group) constituted by pixels having the same pixel structure as the second pixel. To be noted, the pixel array 103 may include a pixel other than the effective pixels 101 and the deterioration detection pixels 102.

The effective pixels 101 and the deterioration detection pixels 102 are each a pixel in the radiation-irradiated region in the pixel array 103. The radiation-irradiated region is a region that is not covered by a shielding member, which will be described later, and that is configured such that semiconductor elements constituting the pixel can be irradiated with the radiation.

Pixel signals output from the effective pixels 101 constitute image data output from the radiation detector 1. In contrast, pixel signals output from the deterioration detection pixels 102 are used for adjusting or correcting a driving voltage or the like of the elements constituting the effective pixels 101. In the present embodiment, the pixel signals output from the deterioration detection pixels 102 do not constitute the output image data of the radiation detector 1. However, as in embodiments described below, the pixel signals of the deterioration detection pixels 102 may be used as part of the output image data of the radiation detector 1 and use the deterioration detection pixels 102 as a kind of effective pixels.

As will be described in detail below, the effective pixels 101 have a first pixel structure, and the deterioration detection pixels 102 have a second pixel structure different from the first pixel structure. To be noted, the arrangement of the effective pixels 101 and the deterioration detection pixels 102 is not limited to the illustrated arrangement.

Pixel Structure of Effective Pixel

As illustrated in FIGS. 1 and 2, each effective pixel 101 includes a detection diode D11 serving as a first conversion element, a reset transistor M11 serving as a first reset transistor, an amplification transistor M12 serving as a first amplification transistor, and a selection transistor M13.

The detection diode D11 is a conversion element that converts an incident energy beam into a signal charge and accumulates the signal charge. The detection diode D11 of the present embodiment converts a radioactive ray into electrons serving as the signal charge and accumulates the electrons. The radioactive ray serving as a detection target may be an X-ray or a different radioactive ray. The reset transistor M11 rests the electric charge accumulated in the detection diode D11. The amplification transistor M12 amplifies and outputs the electric charge accumulated in the detection diode D11. The selection transistor M13 outputs a signal from the amplification transistor M12 to a signal line 200 in accordance with a control pulse (SEL) from the vertical scanning circuit 207.

To be noted, the electric charge accumulated in the detection diode D11 may be holes. A photoelectric conversion film may be used instead of the detection diode D11. In addition, the transistors M11, M12, and M13 may each be, for example, an N-type field effect transistor (metal-oxide-semiconductor field effect transistor: MOSFET), but may be a transistor of a different kind such as a P-type MOSFET, a junction field effect transistor: JFET, or a bipolar transistor.

The gate of the reset transistor M11 is connected to a control line 201, the drain of the reset transistor M11 is connected to a first power source voltage line 301, and the source of the reset transistor M11 is connected to the detection diode D11. The gate of the amplification transistor M12 is connected to the detection diode D11, the drain of the amplification transistor M12 is connected to a second power source voltage line 302, and the source of the amplification transistor M12 is connected to the drain of the selection transistor M13. The gate of the selection transistor M13 is connected to a control line 203, and the source of the selection transistor M13 is connected to a signal line 200.

When a radioactive ray is incident on the effective pixel 101, an electric charge is generated and accumulated in the detection diode D11. When a control pulse (SET) from the vertical scanning circuit 207 is input to the selection transistor M13, the selection transistor M13 takes a conducting state. In this case, a source follower circuit constituted by the power source voltage line 302, the amplification transistor M12, and an unillustrated current source connected to the signal line 200 operates, and a signal corresponding to the electric charge accumulated in the detection diode D11 is output to the signal line 200. When a control pulse (RES) from the vertical scanning circuit 207 is input to the reset transistor M11, the potential of the detection diode D11 is reset to the voltage value of the power source voltage line 301.

Pixel Structure of Deterioration Detection Pixel

As illustrated in FIGS. 1 and 2, each deterioration detection pixel 102 includes a detection diode D21 serving as a second conversion element, a reset transistor M21 serving as a second reset transistor, an amplification transistor M22 serving as a second amplification transistor, and a selection transistor M23. That is, the basic constituent elements of the deterioration detection pixel 102 is the same as those of the effective pixel 101.

The pixel structure of the deterioration detection pixel 102 is different from the pixel structure of the effective pixel 101 in that the detection diode D21 is not connected to the gate of the amplification transistor M22. That is, the gate of the amplification transistor M22 of the deterioration detection pixel 102 is insulated from the detection diode D21. The gate of the amplification transistor M22 is connected to a third power source voltage line 403 instead of the detection diode D21. The power source voltage line 403 supplies a constant voltage generated by an unillustrated circuit to the gate of the amplification transistor M22.

To be noted, the "constant voltage" in the present disclosure refers to a voltage value that is not dependent on the incident amount of the energy beam. The constant voltage is not limited to a voltage that is constant throughout the lifetime of the radiation detector 1, and for example, the value of the constant voltage applied to the power source voltage line 403 may be changed by using an adjustment value dV1 that will be described later.

As described above, the deterioration detection pixel 102 has a pixel structure in which a control electrode (gate electrode) of the amplification transistor M22 is connected to the constant voltage source via the power source voltage line 403. The power source voltage line 403 is a third power supply line different from a first supply line (power source voltage line 401) through which a voltage is supplied to a main electrode of the reset transistor M21 and a second power supply line (power source voltage line 402) through which a voltage is applied to a main electrode of the amplification transistor M22.

That is, whereas a voltage corresponding to the incident amount of the energy beam is applied to the gate of the amplification transistor M12 in the effective pixel 101, a constant voltage independent from the incident amount of the energy beam is applied to the gate of the amplification transistor M22 in the deterioration detection pixel 102. As a result of this, the deterioration detection pixel 102 outputs a signal corresponding to the voltage applied from the constant voltage source to the main electrode of the amplification transistor M22, that is, the driving voltage of the power source voltage line 403.

The other elements of the pixel structure of the deterioration detection pixel 102 are the same as those of the effective pixel 101. That is, the gate of the reset transistor M21 is connected to a control line 201', the drain of the reset transistor M21 is connected to the first power source voltage line 401, and the source of the reset transistor M21 is connected to the detection diode D21. The drain of the amplification transistor M22 is connected to the second power source voltage line 402, and the source of the amplification transistor M22 is connected to the drain of the selection transistor M23. The gate of the selection transistor M23 is connected to a control line 203', and the source of the selection transistor M23 is connected to the signal line 200.

A circuit (constant voltage source) that applies a voltage to the first power source voltage lines 301 and 401 may be shared between the effective pixel 101 and the deterioration detection pixel 102. In addition, a circuit (constant voltage source) that applies a voltage to the second power source voltage lines 302 and 402 may be shared between the effective pixel 101 and the deterioration detection pixel 102. Further, a voltage may be supplied from the same circuit to the first power source voltage lines 301 and 402 and the second power source voltage lines 302 and 402.

Further, a circuit (constant voltage source) that applies a voltage to the third power source voltage line 403 of the deterioration detection pixel 102 may be shared with the first power source voltage line 401 or the second power source voltage line 402. That is, the value of the voltage applied to the gate of the amplification transistor M22 of the deterioration detection pixel 102 may be equal to the driving voltage of the power source voltage lines 401 and 402.

When a radioactive ray is incident on the deterioration detection pixel 102, an electric charge is generated and accumulated in the detection diode D21. To be noted, the electric charge in the detection diode D21 is not reflected on the pixel signal from the deterioration detection pixel 102.

When a control pulse (SEL) from the vertical scanning circuit 207 is input to the selection transistor M23, the selection transistor M23 takes a conducting state. In this case, a source follower circuit constituted by the power source voltage line 402, the amplification transistor M22, and an unillustrated current source connected to the signal line 200 operates. In this case, unlike the effective pixel 101 that outputs a signal corresponding to the amount of the electric charge accumulated in the detection diode D11, a signal corresponding to the voltage value of the third power source voltage line 403 is output to the signal line 200. When a control pulse (RES) from the vertical scanning circuit 207 is input to the reset transistor M21, the potential of the detection diode D21 is reset to the voltage value of the power source voltage line 401.

To be noted, a configuration in which the deterioration detection pixel 102 does not include the detection diode D21 serving as a second conversion element may be employed. To be noted, since the layout of the pixel array 103 is uniformized by forming the detection diodes D21 from the same material as the detection diodes D11 of the effective pixels 101, the design of the circuit is facilitated, or the unevenness of the circuit characteristics caused by the presence and absence of detection diodes.

As illustrated in FIG. 2, a semiconductor substrate constituting the radiation detector 1 is partitioned into a plurality of active regions each having an approximate rectangular shape by an element isolation region that is insulating. An impurity region is formed in each active region, and the impurity region functions as a semiconductor element. For example, the detection diodes D11 and D21 are formed by doping the surface of P wells with N-type impurities. In addition, by forming a gate insulating film such as silicon oxide on a gate region of the substrate surface and further forming a polysilicon layer, the gate electrode of each transistor is formed. Further, an insulating film covering the semiconductor elements on the substrate are formed, and a wiring layer in which the power source voltage lines 301, 302, 401, 402, and 403, the signal lines 200 and 200', and the like are formed is provided on the insulating film. The wiring pattern of the wiring layer is connected to each element via contact plugs or via plugs.

Circuit and Operation of Overall Pixel Array

As illustrated in FIG. 1, the vertical scanning circuit 207, the column circuit portion 204, the horizontal scanning circuit 205, the output circuit 206, and the control circuit 208 are disposed around the pixel array 103. The pixels constituting the pixel array 103 are connected to the vertical scanning circuit 207 on a row basis.

The vertical scanning circuit 207 controls the accumulation period and driving timing of the pixels. RES and SET in the drawings are control pulses or control signals that are supplied from the vertical scanning circuit 207 to the pixels via the control lines 201, 201', 203, and 203'. To be noted, among the control lines 201 and 201' through which the control pulse RES is supplied, a control line connected only to the effective pixels 101 will be referred to as a "control line 201", and a control line connected to at least one deterioration detection pixel 102 will be referred to as a "control line 201'". Among the control lines 203 and 203' through which the control pulse SEL is supplied, a control line connected only to the effective pixels 101 will be referred to as a "control line 203", and a control line connected to at least one deterioration detection pixel 102 will be referred to as a "control line 203'". In addition, the control pulses RES and SEL will be each denoted with a suffix indicating the pixel row to which the signal is supplied. For example, RES(m) is a pulse supplied to a pixel in the m-th row.

The control lines 203 and 203' are connected to an unillustrated current source. For example, when the pulse of SEL(m) is at an active level, the selection transistors M13 and M23 of the pixels in the m-th row are in an ON state. As a result of this, a current is supplied from the current source to the amplification transistors M12 and M22 of the pixels in the m-th row.

In the effective pixel 101 in the m-th row of FIG. 1, the power source voltage line 302, the amplification transistor M12, and an unillustrated current source connected to the signal line 200 constitute a source follower circuit. As a result of this source follower circuit being formed, the amplification transistor M12 outputs a pixel signal to the signal line 200 or 200' via the selection transistor M13.

In addition, the pixels constituting the pixel array 103 are connected to the column circuit portion 204 via the signal lines 200 and 200' on a column basis. In the description below, a signal line connected only to the effective pixels 101 will be referred to as a "signal line 200", and a signal line connected to at least one of the deterioration detection pixels 102 will be referred to as a "signal line 200'". The column circuit portion 204 includes a plurality of column circuits respectively provided for the signal lines 200 and 200'. In addition, the column circuit portion 204 is connected to the horizontal scanning circuit 205 and the output circuit 206.

The column circuits each output a processed signal to the output circuit 206. Examples of this processing include amplification and analogue-to-digital (A/D) conversion of the signals. The horizontal scanning circuit 205 sequentially selects the plurality of column circuits included in the column circuit portion 204. As a result of this, the signals respectively held by the plurality of column circuits are sequentially output to the output circuit 206. The output circuit 206 outputs a signal to the outside of the radiation detector 1.

The control circuit 208 is connected to each of the vertical scanning circuit 207, the column circuit portion 204, and the horizontal scanning circuit 205 via a driving line for supplying a driving signal.

Figure 3:
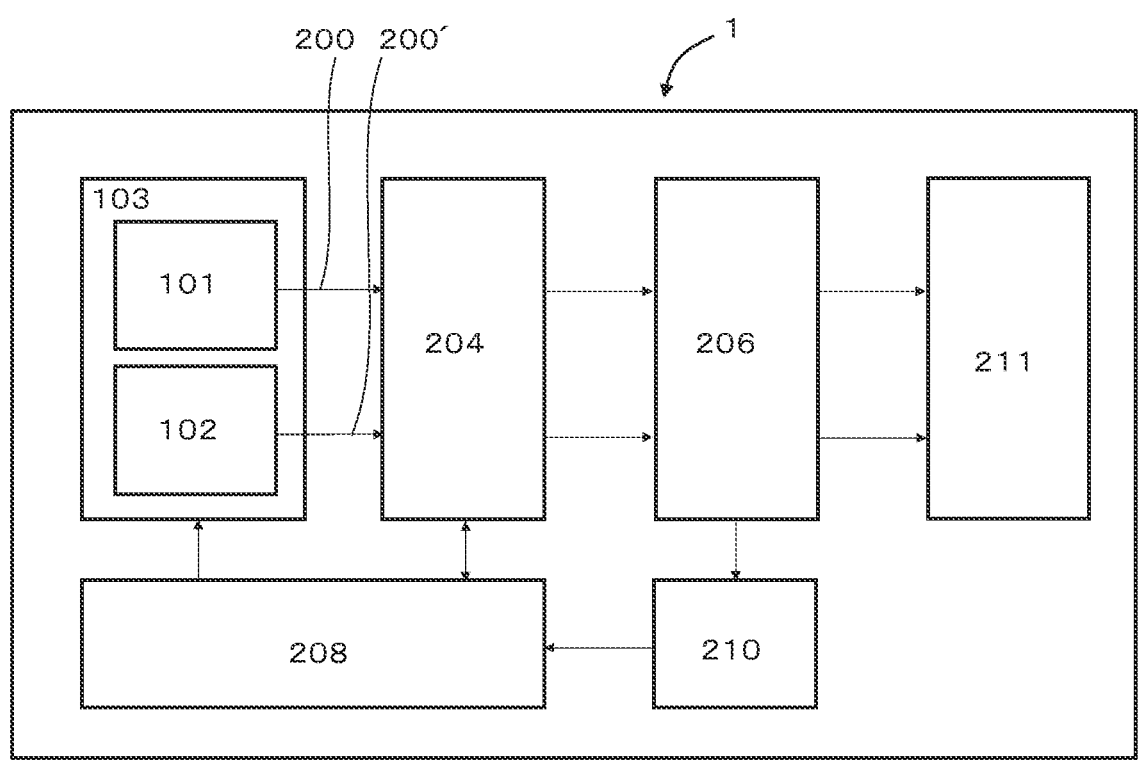
FIG. 3 is a diagram illustrating a system configuration example of a detector according to embodiments.

FIG. 3 illustrate a system configuration example of the radiation detector 1. The radiation detector 1 may include a calculation portion 210 and/or an image processing portion 211 in addition to the circuit elements described above. The calculation portion 210 is capable of obtaining a signal value of the deterioration detection pixel 102 that will be described later and calculating an adjustment value for adjusting the output level of the effective pixel 101. The image processing portion 211 is capable of interpolating pixel signals of the deterioration detection pixels 102 by using pixel signals of the effective pixels 101 around the deterioration detection pixels 102 and outputting the interpolated image data to the outside of the radiation detector 1 as will be described in embodiments below.

Time-Related Deterioration Caused by Radiation

Incidentally, the radiation detector 1 deteriorates over time due to the irradiation with the radioactive ray at the time of imaging. Specifically, a signal of the radioactive ray detected by the detection diode D11 in the effective pixel 101 is output to the signal line 200 or 200' via the amplification transistor M12. Here, as known as a total ionizing dose effect of the radioactive ray, an electric charge generated by the ionizing effect of the radioactive ray is trapped in a hole trap in an oxide film (insulating film) of the gate electrode, and thus the threshold voltage of the amplification transistor M12 changes. As a result of this, the output level of the effective pixel 101 deviates from an optimal state, and the detection precision of the radioactive ray is degraded in some case.

As a method for compensating for the degradation of the detection precision resulting from general time-related deterioration of the radiation detector 1 not caused only by the radiation, a pixel disposed in a non-irradiated region that is not irradiated with an energy beam is sometimes used. However, the incident amount of the radiation is different between the effective pixel 101 positioned in the radiation-irradiated region and a pixel in the non-irradiated region, and therefore the speed of progress of the time-related deterioration caused by radiation also differs. Therefore, by a method such as subtracting a pixel signal of a pixel in the non-irradiated region or the shielded pixel from the pixel signal of the effective pixel 101, it is difficult to appropriately address the degradation of the detection precision resulting from the time-related deterioration caused by radiation.

Therefore, in the present embodiment, the deterioration detection pixels 102 having a pixel structure different from the effective pixels 101 are disposed in the radiation-irradiated region in the pixel array 103. That is, the deterioration detection pixel 102 is configured such that the accumulated amount of radiation incident thereon is normally approximately equal to the accumulated amount of radiation incident on the effective pixel 101.

As described above, the deterioration detection pixel 102 has a pixel structure in which the third power source voltage line 403 is connected to the gate of the amplification transistor M22. Therefore, the pixel signal output from the deterioration detection pixel 102 is affected by the time-related deterioration of the amplification transistor M22 resulting from the accumulated radiation amount approximately equal to that of the amplification transistor M12 of the effective pixel 101.

Therefore, by monitoring the change in the output signal of the deterioration detection pixel 102 over time and detecting change in the threshold value of the amplification transistor M12 of the effective pixel 101 or the like, the degree of the time-related deterioration can be appropriately evaluated. In the present embodiment, a configuration for improving the resistance against the time-related deterioration caused by radiation will be described.

Regarding a transistor such as the amplification transistor M12, the potential difference between the gate and the source will be represented by $V_{GS}$, and the threshold voltage will be represented by VIE. Typically, the transistor is in a conducting state when $V_{GS}-V_{TH}>0$ holds. In the case where the transistor is caused to deteriorate over time by irradiating the transistor with radiation of tens of kGy to hundreds of kGy in terms of the accumulated irradiation amount, the potential of the transistor is affected, and the threshold voltage $V_{TH}$ changes by 0.1 V or more between before and after the irradiation in some cases. In the case where $V_{TH}$ increases, a state in which the transistor is less likely to be conductive in response to input of a signal of the detection diode to the gate of the transistor, that is, a state in which the sensitivity of the effective pixel 101 has decreased is taken.

Here, the deterioration detection pixel 102 outputs a signal corresponding to the input from the power source voltage line 403 and to the threshold voltage VIII of the amplification transistor M22 to the signal line 200' independently from the potential of the detection diode D21. Further, the accumulated radiation amount of the amplification transistor M22 is approximately equal to the accumulated radiation amount of the amplification transistor M12 of the effective pixel 101. Therefore, the threshold voltage VIII of the amplification transistor M22 changes similarly to the threshold voltage VIII of the amplification transistor M12 of the effective pixel 101. The pixel signal of the deterioration detection pixel 102 changes in accordance with the change in the threshold voltage VIII of the amplification transistors M12 and M22 similarly to the pixel signal of the effective pixel 101.

Figure 4:
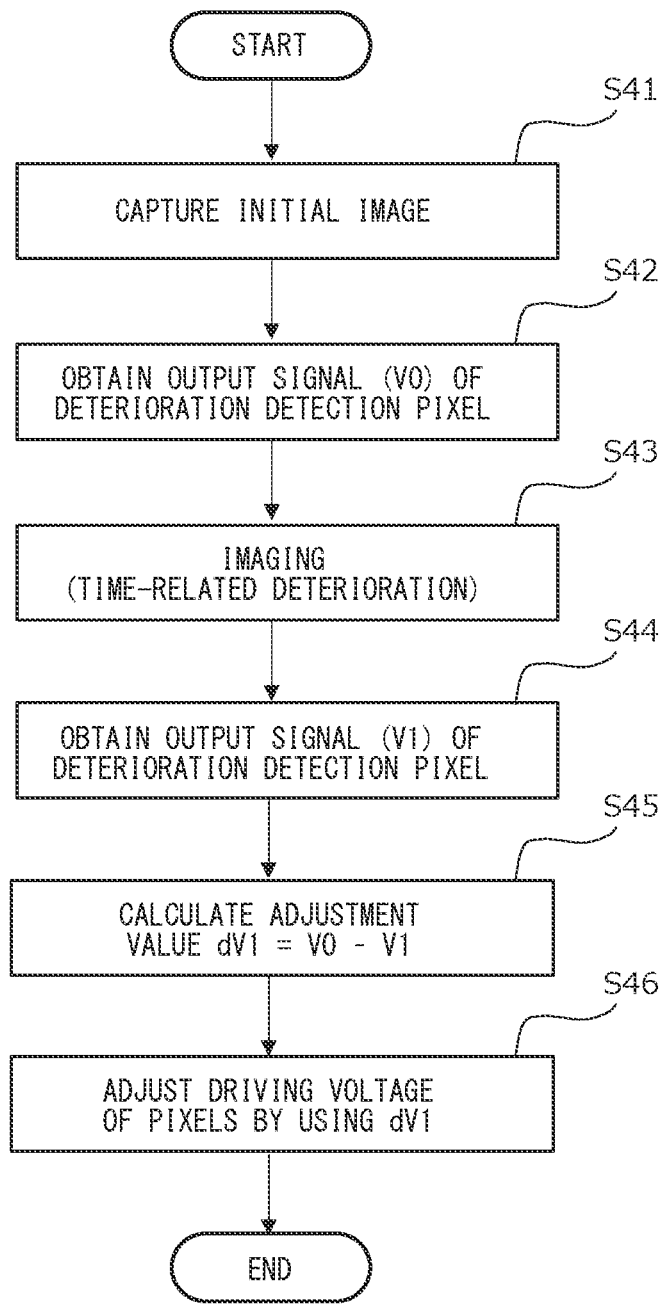
FIG. 4 is a flowchart illustrating an example of control according to the first through third and fifth embodiments.

A flowchart of FIG. 4 illustrates a control example in the present embodiment. Each step of the flowchart is realized by, for example, the control circuit 208 illustrated in FIG. 3 loading a program from an unillustrated memory provided in the radiation detector 1 and executing the program. The memory is an example of a computer-readable non-transitory recording medium.

First, in step S41, an initial image is captured in an initial state serving as a first state before the time-related deterioration of the radiation detector 1. At this time, in step S42, a signal V0 of the deterioration detection pixel 102 in the first state is obtained by the column circuit portion 204. The signal V0 serves as a pixel signal in the first state. The signal V0 can be obtained at the same time as the capturing of the initial image.

Then, time-related deterioration occurs in step S43 as a result of the imaging being repetitively performed by using the radiation detector 1, and the pixel signals of the effective pixel 101 and the deterioration detection pixel 102 both deviate from the signal value of the initial state.

In a state after the time-related deterioration of the radiation detector 1 serving as a second state, a signal V1 serving as an output from the deterioration detection pixel 102 is obtained by the column circuit portion 204 in step S44. The signal V1 can be obtained at the same time as imaging in the second state. Next, as a difference in the signal of the deterioration detection pixel 102 between the first state and the second state, an adjustment value dV1=V0−V1 is calculated in step S45.

To be noted, the signals V0 and V1 may be obtained by an unillustrated memory buffer of the column circuit portion 204. In this case, the adjustment value dV1 is calculated by the control circuit 208. In addition, after the signals V0 and V1 are amplified and A/D-converted by the column circuit portion 204 and the output circuit 206, the calculation portion 210 illustrated in FIG. 3 may calculate the adjustment value dV1 by converting the converted signals back into the non-converted signals. In these examples, the control circuit 208 or the calculation portion 210 that calculates the adjustment value dV1 is an example of a detection portion (detection circuit) that detects the change in the threshold voltage of the amplification transistor M12 serving as a first amplification transistor on the basis of the difference (dV1) between an output signal (V0) of a second pixel in a first state and an output signal (V2) of the second pixel in a second state that is after the first state.

In step S46, the control circuit 208 adjusts the driving voltage of elements constituting the effective pixel 101 by using the adjustment value dV1. That is, the control circuit 208 is an example of a first adjustment portion (first adjustment circuit) that adjusts the voltage applied to the main electrode of the first amplification transistor on the basis of the difference (dV1) between the output signal of the second pixel in the first state and the output signal of the second pixel in the second state that is after the first state. For example, in the case where the driving voltage of the power source voltage line 302 of the amplification transistor M12 in the first state is represented by VDD and the adjusted driving voltage is represented by VDD', the adjustment is performed such that VDD'=VDD+dV1 is satisfied.

To be noted, in the case where the potential difference between the drain and source of a transistor is represented by $V_{DS}$, the transistor can be operated in a saturated region typically when $V_{DS} > V_{GS} - V_{TH}$ is satisfied. By adding the adjustment value dV1 to the driving voltage VDD of the amplification transistor M12 as described above, the output voltage of the amplification transistor M12 can be shifted by dV1, and thus the output level of the effective pixel 101 can be made closer to the initial state.

For example, in the case where an N-type MOSFET is used as each of the amplification transistors M12 and M22, it is assumed that the threshold voltage VIII has shifted in the positive direction by the total ionizing dose effect of the radiation. In this case, as a result of increase in the threshold voltage VIII, the output level of the source follower circuit constituted by the amplification transistor M12 becomes lower than before the deterioration. Here, since the threshold voltage $V_{TH}$ has also increased in the deterioration detection pixel 102, the signal V1 after the deterioration is smaller than the signal V0 before deterioration, that is, V1<V0 holds, and thus the adjustment value dV1 is a positive value. Therefore, in the adjustment of the driving voltage VDD in step S46, the driving voltage VDD of the amplification transistor M12 is increased by dV1, and thus the output level of the source follower circuit constituted by the amplification transistor M12 of the effective pixel 101 is increased. That is, the effect of the shift of the threshold voltage $V_{TH}$ of the amplification transistor M12 in the positive direction is canceled by the increase in the driving voltage VDD, and thus the level of the pixel signal of the effective pixel 101 can be made closer to the state before the deterioration. To be noted, whether dV1 is a positive value or a negative value can change in accordance with the type of the transistor and the effect of the radiation such as the shift of $V_{TH}$ resulting from temperature.

That is, according to the present embodiment, the radiation detector 1 capable of improving the resistance to time-related deterioration caused by radiation can be provided.

In addition, simultaneously with the adjustment of the driving voltage of the power source voltage line 302, the driving voltage of the power source voltage line 402 can be also adjusted from VDD to VDD'. By adjusting the driving voltage of the amplification transistors M12 and M22 for all the pixels in the irradiated region of the pixel array 103, the output level of the effective pixels 101 can be readjusted easily. That is, setting a state immediately after the driving voltage of the amplification transistors M12 and M22 is adjusted from VDD to VDD' as a new first state and performing the processing of steps S44 to S46 in a second state after further progress of the time-related deterioration may be repeatedly performed. As a result of this, in accordance with the progress of the time-related deterioration corresponding to the accumulated radiation amount, the output level of the effective pixels 101 can be maintained at an appropriate level, and the detection precision of the radiation detector 1 can be maintained at a high level for a long period of time, that is, the lifetime of the detector can be extended.

In addition, the time-related deterioration caused by radiation also occurs in parts of the pixel structure other than the amplification transistor M12. For example, the dark current in the detection diode D11 increases.

According to the present embodiment, the change in the output level of the effective pixel 101 resulting from the threshold change of the amplification transistor M12 can be separated from the change in the output level of the effective pixel 101 resulting from the increase in the dark current of the detection diode D11. That is, a signal charge generated by the dark current of the detection diode D11 is reflected on the pixel signal of the effective pixel 101 via the amplification transistor M12. Therefore, the change in the output level of the effective pixel 101 caused by the time-related deterioration is affected by both the threshold change of the amplification transistor M12 and the increase in the dark current of the detection diode D11.

According to the present embodiment, since the detection diode D21 and the amplification transistor M22 of the deterioration detection pixel 102 are separated as a circuit, the change in the output level of the pixel signal of the deterioration detection pixel 102 basically reflects the threshold change of the amplification transistor M12. Therefore, the effect of the time-related deterioration of the amplification transistor M22 can be detected while being separated from the time-related deterioration of other elements of the pixel structure such as the increase in the dark current of the detection diode D21. As a result of this, a more appropriate measure can be taken to address the time-related deterioration caused by radiation.

To be noted, in the flowchart described above, the interval between the time point (first state) serving as the standard for the time-related deterioration and the time point (second state) at which the degree of time-related deterioration is determined can be arbitrarily set. For example, the adjustment interval can be determined on the basis of the number of times of imaging using the radiation detector 1, the accumulated irradiation time of the radiation, or the use period of the radiation detector 1. For example, the driving voltage VDD of the power source voltage line 302 and 402 may be adjusted each time the number of times of imaging or the like increases by a predetermined amount.

In addition, although the driving voltage VDD of the power source voltage lines 302 and 402 is adjusted by the control circuit 208, an unillustrated voltage adjustment portion may be provided.

In addition, the driving voltage of the third power source voltage line 403 may be different from the driving voltage of the first and second power source voltage lines 301, 302, 401, and 402.

Second Embodiment

As a second embodiment, a method of adjusting the driving voltage of the power source voltage lines 301 and 401 serving as the reset potential for the reset transistors M11 and M21 will be described. In the description below, it is assumed that elements denoted by the same reference signs as in the first embodiment substantially have the same configurations and effects as in the first embodiment unless otherwise described.

The radiation detector 1 according to the present embodiment has the same structure as in the first embodiment, and calculates the adjustment value dV1 in accordance with the flowchart of FIG. 4 (S41 to S45). To be noted, in the present embodiment, a driving voltage VRES of the power source voltage lines 301 and 401 for driving the reset transistors M11 and M21 is adjusted by using the adjustment value dV1. That is, the control circuit 208 is an example of a second adjustment portion (second adjustment circuit) that adjusts the reset potential for resetting the potential of the control electrode of the first amplification transistor on the basis of the difference (dV1) between the output signal of the second pixel in the first state and the output signal of the second pixel in the second state that is after the first state.

Specifically, the voltage of the power source voltage line 301 is represented by VRES, and the adjusted voltage is represented by VRES'. In the present embodiment, in step S46 of FIG. 4, VRES'=VRES+dV1 holds.

In the case where the threshold voltage of the amplification transistor M12 has changed due to the time-related deterioration, the signal voltage deviates from a designed operation range, which can lead to a malfunction. Specifically, in the case where the threshold voltage VIII is high, when the signal charge amount of the detection diode D11 is small, the gate voltage $V_{GS}$ of the amplification transistor M12 cannot exceed VIII, thus the output of the source follower circuit is substantially zero, and as a result, the sensitivity of the effective pixel 101 becomes low.

According to the present embodiment, the sensitivity of the effective pixel 101 can be maintained by adjusting the driving voltage VRES of the reset transistor M11 on the basis of the adjustment value dV1.

To be noted, similarly to the first embodiment, the driving voltage VRES of the power source voltage lines 301 and 401 can be adjusted to VRES' for all the effective pixels 101 and deterioration detection pixels 102 in the irradiated region. A similar effect can be obtained also by performing the adjustment from VRES to VRES' only when a control pulse RES(m) and a control pulse RES(m+1) to turn on the reset transistors M11 and M21 are applied.

Third Embodiment

A third embodiment will be described. In the description below, it is assumed that elements denoted by the same reference signs as in the first embodiment substantially have the same configurations and effects as in the first embodiment unless otherwise described.

The present embodiment is a combination of the first embodiment and the second embodiment. That is, in step S46 in FIG. 4, the adjustment of the driving voltage VDD of the amplification transistor M12 described in the first embodiment and the adjustment of the driving voltage VRES of the reset transistor M11 described in the second embodiment are performed simultaneously. That is, the control circuit 208 is an example of a third adjustment portion (third adjustment circuit) that adjusts both the voltage applied to the main electrode of the first amplification transistor and the reset potential for resetting the potential of the control electrode of the first amplification transistor, on the basis of the difference (dV1) between the output signal of the second pixel in the first state and the output signal of the second pixel in the second state that is after the first state. As a result of this, a similar effect to the first and second embodiments can be obtained.

In addition, the adjustment amount of VDD and VRES may be obtained in consideration of the adjustable range of each driving voltage, for example, by multiplying the adjustment value dV1 by a preset coefficient. As an example, VDD and VRES may be each adjusted by an adjustment amount of dV1×0.5. The coefficient may be different from 0.5.

By adjusting both the driving voltages VDD and VRES, the range of time-related deterioration that can be addressed can be widened.

To be noted, by adjusting both the driving voltages VDD and VRES, the adjustment amount (the value of voltage to be adjusted) is reduced as compared with a case where only one of these is adjusted. Typically, the amount of electric charge held in an insulating layer of the gate electrode as a result of irradiation with a radioactive ray depends on the electric field in the insulating layer. Therefore, if the adjustment value is large and the electric field in the transistor becomes high, the deterioration resistance of the radiation detector can be degraded thereafter. By adjusting the adjustment value dV1 separately and simultaneously for the driving voltages VDD and VRES, the adjustment amount for each driving voltage can be suppressed, and thus occurrence of degradation of the deterioration resistance of the radiation detector caused by intense adjustment of the driving voltages can be suppressed.

Fourth Embodiment

A fourth embodiment will be described. In the description below, it is assumed that elements denoted by the same reference signs as in the first embodiment substantially have the same configurations and effects as in the first embodiment unless otherwise described.

Figure 5:
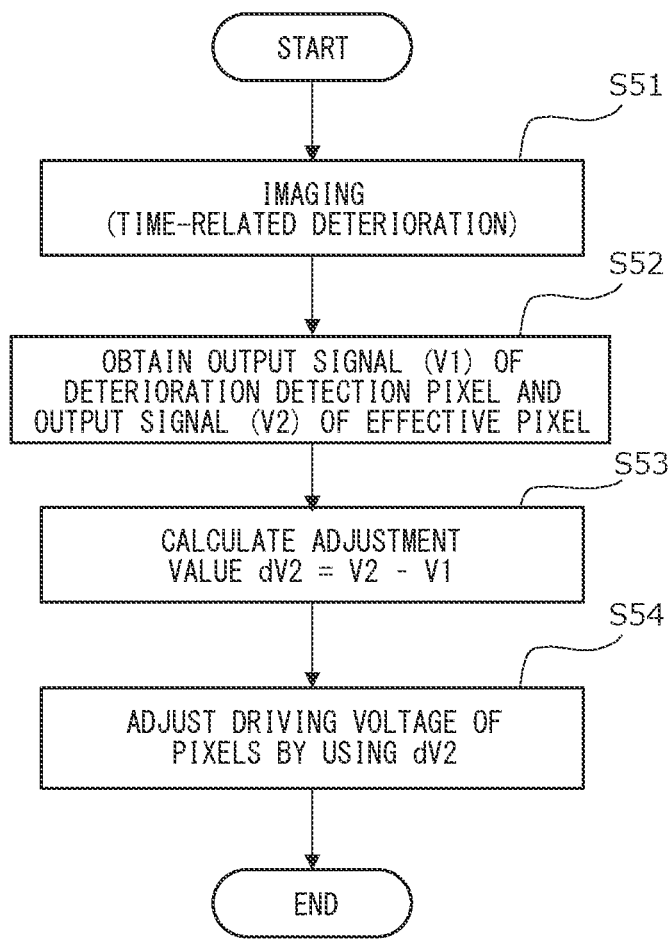
FIG. 5 is a flowchart illustrating an example of control according to a fourth embodiment.

The radiation detector 1 according to the present embodiment detects change in the dark current level of the detection diode D11 caused by the time-related deterioration in accordance with a flowchart of FIG. 5.

As illustrated in FIG. 5, in step S51, time-related deterioration occurs as a result of repetitively performing imaging using the radiation detector 1, and the pixel signals of both the effective pixel 101 and the deterioration detection pixel 102 deviate from the signal values of the initial state.

In step S52, in a state after the radiation detector 1 has gone through the time-related deterioration, the column circuit portion 204 obtains the signal V2 that is a dark output of the effective pixel 101 and the signal V1 that is a dark output of the deterioration detection pixel 102. Then, in step S53, an adjustment value dV2=V2−V1 is calculated by using the signals V1 and V2 of the effective pixel 101 and the deterioration detection pixel 102.

To be noted, the signals V1 and V2 may be obtained by an unillustrated memory buffer of the column circuit portion 204. In this case, the adjustment value dV2 is calculated by the control circuit 208. In addition, after performing amplification and A/D conversion of the signals V1 and V2 by the column circuit portion 204 and the output circuit 206, the calculation portion 210 illustrated in FIG. 3 may calculate the adjustment value dV2 by converting the converted signals into non-converted signals.

Then, in step S54, the control circuit 208 adjusts the driving voltage of the elements constituting the effective pixel 101 by using the adjustment value dV2. That is, the control circuit 208 is an example of a fourth adjustment portion (fourth adjustment circuit) that adjusts the reset potential for resetting the potential of the control electrode of the first amplification transistor on the basis of the difference (dV2) between the output signal of the first pixel and the output signal of the second pixel each obtained in a state in which the energy beam is not incident.

Here, whereas the signal V2 of the effective pixel 101 is affected by the increase in the dark current, the signal V1 of the deterioration detection pixel 102 is independent from the potential of the detection diode D21, but is dependent on the driving voltage VDD of the power source voltage line 403 and the threshold of the amplification transistor M22. Therefore, the adjustment value dV2 that is the difference between the signals V1 and V2 reflects the dark current level of the detection diode D11.

Therefore, the driving voltage VRES of the power source voltage line 301 applied to the reset transistor M11 of the detection diode D11 is adjusted to VRES'=VRES+dV2. As a result of this, the change amount of the signal resulting from the dark current of the detection diode D11 can be reset by a high voltage, and thus occurrence of a resetting failure can be suppressed.

To be noted, as described in detail in the third embodiment, degradation of the deterioration resistance of the radiation detector caused by increase in the electric field of the transistor can be avoided more than in a case where the driving voltage VRES is set to be high from the initial state.

Fifth Embodiment

A fifth embodiment will be described. In the description below, it is assumed that elements denoted by the same reference signs as in the first embodiment substantially have the same configurations and effects as in the first embodiment unless otherwise described.

In the present embodiment, the signal range of the pixel signal of the effective pixel 101 is adjusted in parallel with the adjustment of the driving voltage in the first to fourth embodiments.

In the first to fourth embodiments, as a result of adjusting the driving voltages VDD and VRES to address the time-related deterioration caused by radiation, the signal range of the pixel signal of the effective pixel 101 changes from the initial state or from the signal range that is originally intended in the design. Therefore, an adjustment portion (fifth adjustment portion, fifth adjustment circuit) such as an amplification circuit, a gain switching mechanism, or an A/D converter is provided in the column circuit portion 204 or the output circuit 206, and the loading range of the column circuits is adjusted by using this adjustment portion. For example, the relationship between the adjustment values dV1 and dV2 of the driving voltages VDD and VRES and the parameters of the adjustment portion is empirically obtained in advance and stored in a memory of the radiation detector 1.

That is, the column circuit portion 204 or the output circuit 206 is an example of an amplification portion that amplifies the output signals of pixels of the pixel array 103. This amplification portion is configured to adjust the gain for amplifying the output signal of the first pixel in the case of, by using the output signal of the second pixel, adjusting at least one of the voltage applied to the main electrode of the first amplification transistor and the reset potential for resetting the potential of the control electrode of the first amplification transistor.

For example, in the case where the values of signals transmitted to the column circuit portion 204 via the signal lines 200 and 200' have exceeded the loading range of the column circuits, the gain and the loading range of the column circuits are adjusted to be larger. As a result of this, the adjusted signals of the effective pixels 101 and the deterioration detection pixels 102 can be output within the loading range of the column circuits.

Sixth Embodiment

A sixth embodiment will be described. In the description below, it is assumed that elements denoted by the same reference signs as in the first embodiment substantially have the same configurations and effects as in the first embodiment unless otherwise described.

Figure 6:
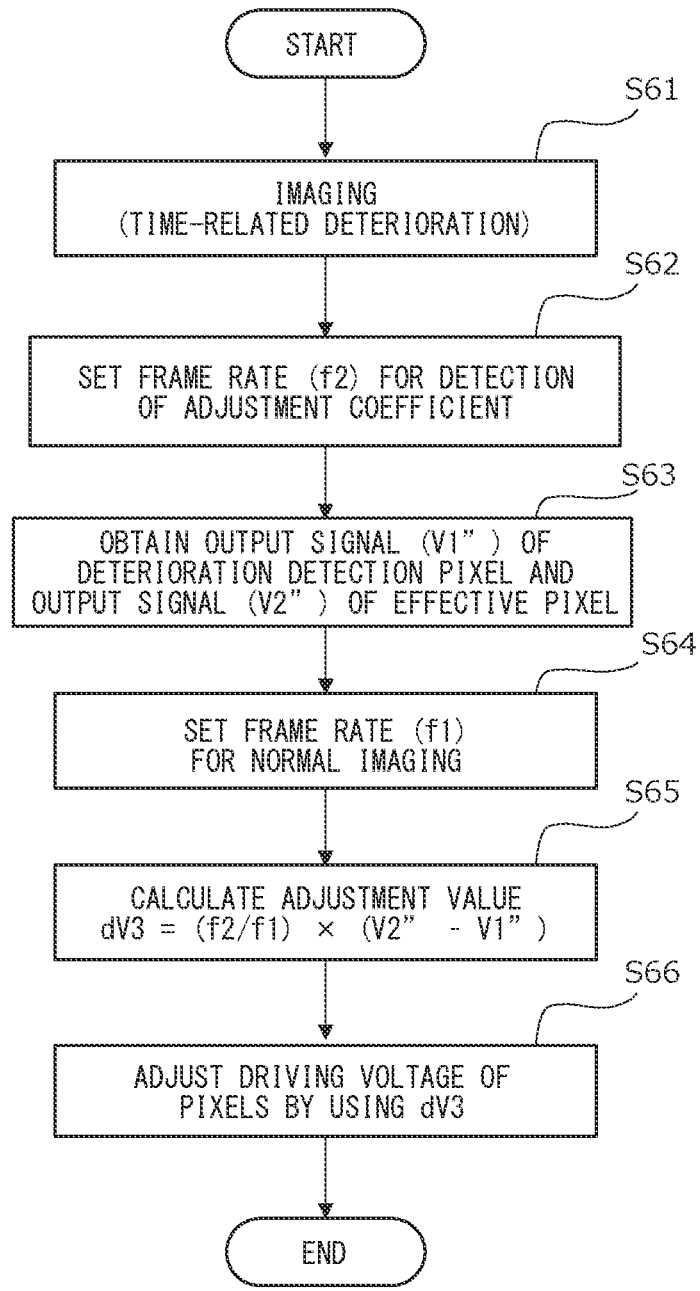
FIG. 6 is a flowchart illustrating an example of control according to a sixth embodiment.

The radiation detector 1 according to the present embodiment detects the change in the dark current of the detection diode D11 caused by the time-related deterioration in accordance with the flowchart of FIG. 6. In the present embodiment, unlike the fourth embodiment using the flowchart of FIG. 5, the frame rate at the time of imaging for detecting the dark current level is set to a value different from that for normal imaging.

In the description below, the frame rate for normal imaging serving as a first frame rate will be represented by f1 [fps], and the frame rate for detecting the adjustment coefficient serving as a second frame rate will be represented by f2 [fps].

As illustrated in FIG. 6, in step S61, time-related deterioration occurs as a result of repetitively performing imaging using the radiation detector 1, and the pixel signals of both the effective pixel 101 and the deterioration detection pixel 102 deviate from the signal values of the initial state.

After the radiation detector 1 has gone through the time-related deterioration, in step S62, the frame rate is changed from f1 to f2 when adjustment should be performed, and in step S63, the column circuit portion 204 obtains a signal V2" that is a dark output of the effective pixel 101 and a signal V1" that is a dark output of the deterioration detection pixel 102. After obtaining the signals, in step S64, the frame rate may be changed back to the frame rate f1 for normal imaging.

Then, in step S65, an adjustment value dV3=(f2/f1)× (V2"−V1") is calculated by using the signals V1" and V2" of the effective pixel 101 and the deterioration detection pixel 102. In step S66, the driving voltage of elements constituting the effective pixel 101, for example, the driving voltage VRES for resetting, is adjusted by using the calculated adjustment value dV3.

(f2/f1) in the calculation formula for dV3 is a ratio between two frame rates. That is, in the present embodiment, the adjustment value dV3 is calculated by converting the difference between signals obtained from the effective pixel 101 and the deterioration detection pixel 102 at a frame rate different from that for normal imaging into a value at a normal frame rate.

In other words, in the case of adjusting the detector by using the output signal of the second pixel, the detector of the present embodiment obtains the output signals of the first pixel and the second pixel at a second frame rate different from a first frame rate in a state in which the energy beam is not incident. Further, the detector is configured to adjust the reset potential for resetting the potential of the control electrode of the first amplification transistor on the basis of the difference between the output signal of the first pixel and the output signal of the second pixel that have been obtained and the ratio between the first frame rate and the second frame rate.

In the case where the dark current is small, the precision of the adjustment value dV3 can be increased by reducing the frame rate as compared with the case of normal imaging to extend the accumulation time of the signals (f2<f1). Conversely, in the case where the dark current has increased due to the time-related deterioration, saturation of the signal V1" can be avoided and the adjustment value dV3 can be calculated within an appropriate range by reducing the frame rate f2 for the adjustment. In this case, f2>f1 may be held.

In addition, the present embodiment can be performed simultaneously with any of the first to third and fifth embodiments.

Seventh Embodiment

A seventh embodiment will be described. In the description below, it is assumed that elements denoted by the same reference signs as in the first embodiment substantially have the same configurations and effects as in the first embodiment unless otherwise described.

Figure 7A:
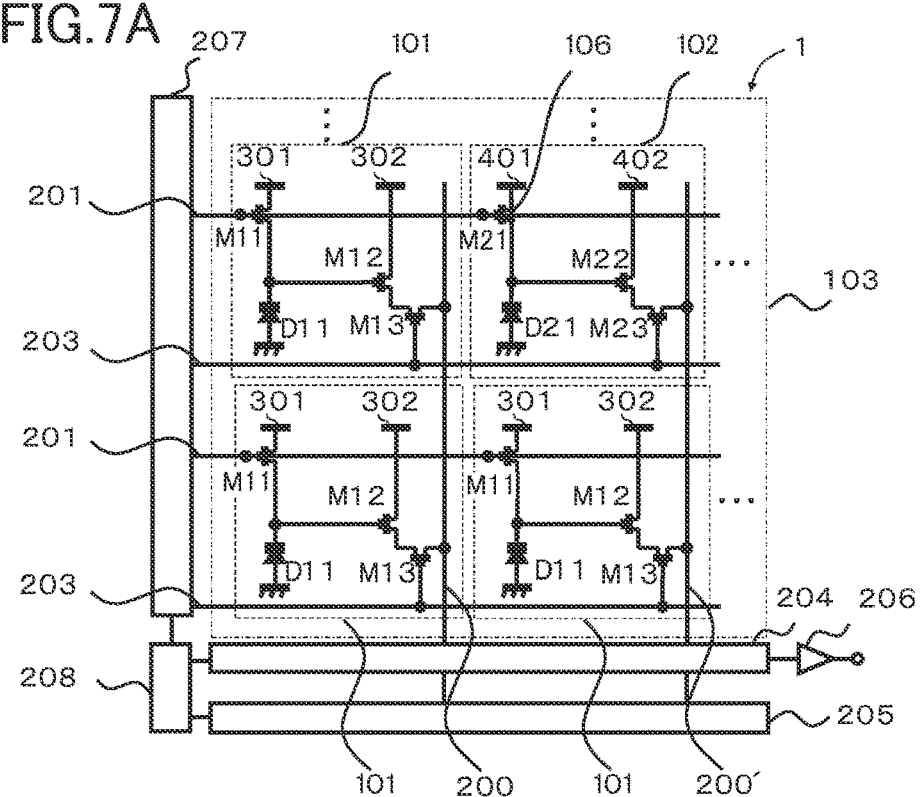
FIG. 7A is a circuit diagram of a detector according to a seventh embodiment.
Figure 7B:
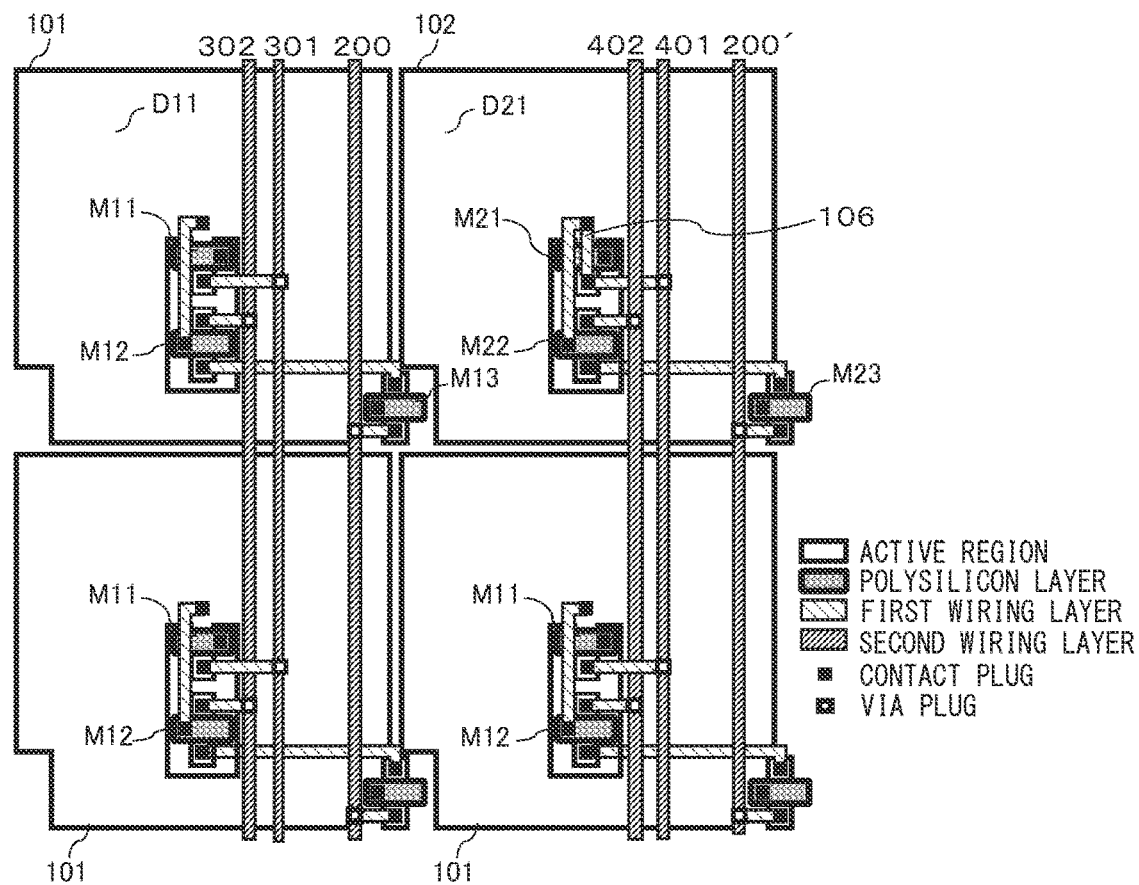
FIG. 7B is a plan view illustrating a wiring structure of pixels.

FIG. 7A is a circuit diagram of the radiation detector 1 according to the present embodiment. FIG. 7B is a plan view illustrating the structure of pixels in the present embodiment. As illustrated in FIGS. 7A and 7B, the radiation detector 1 includes effective pixels 101 and deterioration detection pixels 102 in the irradiated region of the pixel array 103. The pixel structure of the effective pixel 101 is similar to that of the first embodiment.

The deterioration detection pixel 102 of the present embodiment has a pixel structure different from that of the first embodiment. That is, the deterioration detection pixel 102 includes a short circuit portion 106 in which the source and drain of the reset transistor M21 are short-circuited. As a result of this, the detection diode D21 of the deterioration detection pixel 102 is always in a reset state, the signal charge is not accumulated even when the detection diode D21 is exposed to radiation, and the gate voltage of the amplification transistor M22 does not change.

As described above, the deterioration detection pixel 102 of the present embodiment has a pixel structure in which the control electrode (gate electrode) of the amplification transistor M22 is connected to a constant voltage source via the short circuit portion 106 of the reset transistor M21. In other words, in the second pixel of the present embodiment, the reset transistor M21 includes a first main electrode (drain) connected to the constant voltage source and a second main electrode (source) connected to the control electrode (gate) of the amplification transistor M22. Further, the first main electrode and the second main electrode of the reset transistor M21 are short-circuited.

That is, whereas a voltage corresponding to the incident amount of the energy beam is applied to the gate of the amplification transistor M12 in the effective pixel 101, a constant voltage independent from the incident amount of the energy beam is applied to the gate of the amplification transistor M22 in the deterioration detection pixel 102. As a result of this, the deterioration detection pixel 102 outputs a signal corresponding to the voltage (driving voltage of the power source voltage line 403) applied from the constant voltage source to the main electrode of the amplification transistor M22.

Therefore, similarly to the configuration described with reference to FIGS. 1 and 2, the threshold change of the amplification transistor M12 can be detected on the basis of the signal of the deterioration detection pixel 102. In addition, change in the dark current level of the detection diode D11 can be detected on the basis of the signal of the effective pixel 101 and the signal of the deterioration detection pixel 102. Therefore, the resistance to the time-related deterioration caused by radiation can be improved also in the case of using the pixel structure of the deterioration detection pixel 102 of the present embodiment. As the specific measure for the time-related deterioration, methods described in the first to sixth embodiments can be applied.

In addition, as a merit of providing the reset transistor M21 with the short circuit portion 106, the fact that the power source voltage line 403 does not have to be provided separately from the power source voltage line 401 as in the first embodiment can be mentioned. As a result of this, the layouts of patterning in the semiconductor process of the effective pixel 101 and the deterioration detection pixel 102 can be made closer to each other. If the layout difference is small, the uniformity of the circuit characteristics can be improved.

Eighth Embodiment

An eighth embodiment will be described. In the description below, it is assumed that elements denoted by the same reference signs as in the first embodiment substantially have the same configurations and effects as in the first embodiment unless otherwise described.

Figure 8A:
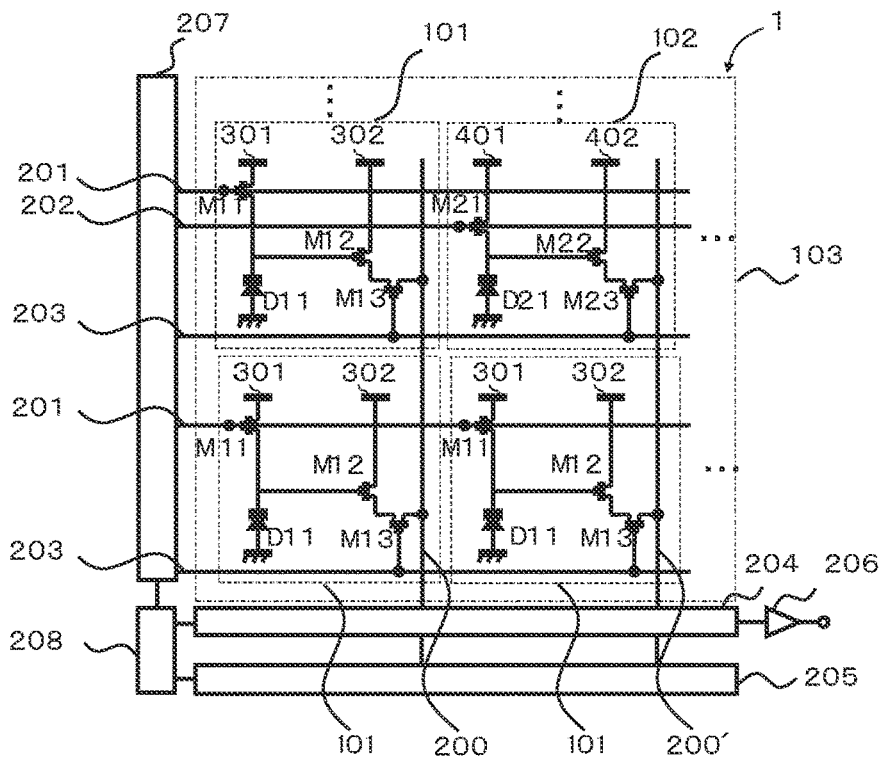
FIG. 8A is a circuit diagram of a detector according to an eighth embodiment.
Figure 8B:
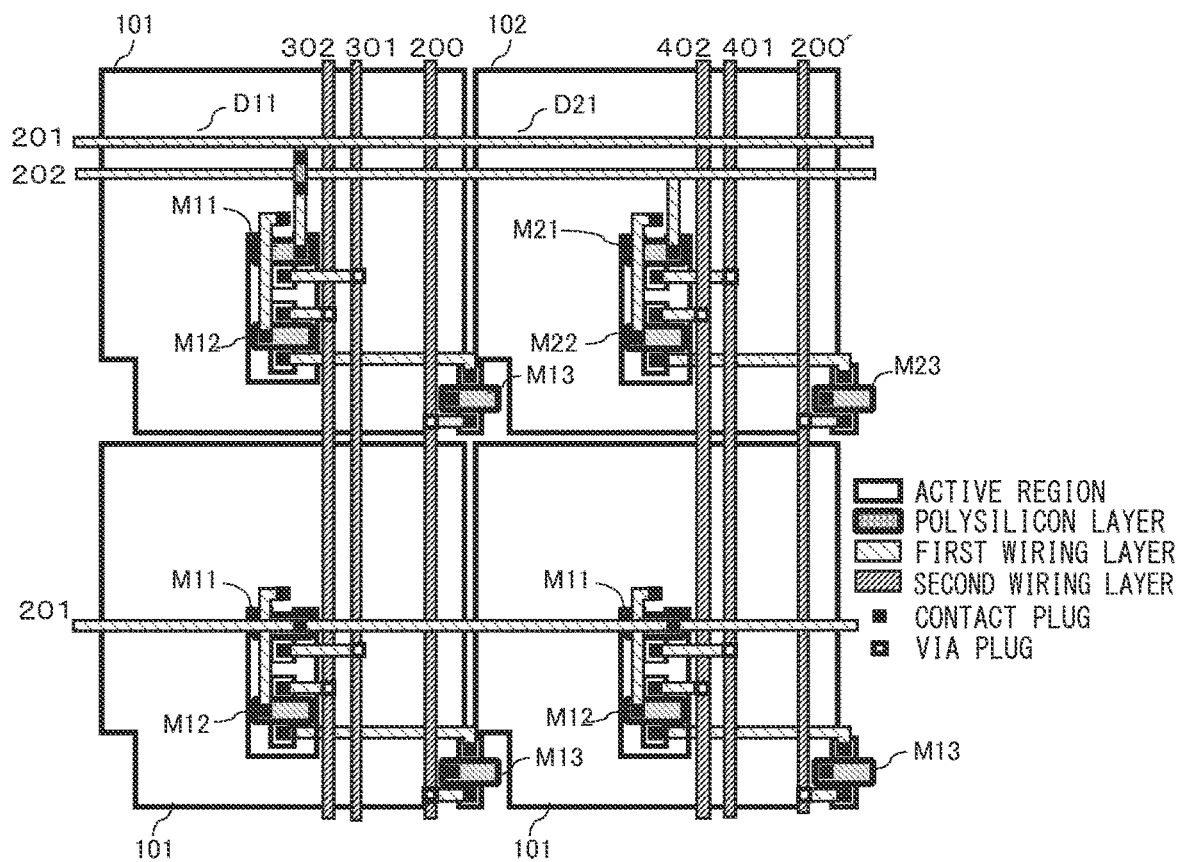
FIG. 8B is a plan view illustrating a wiring structure of pixels.

FIG. 8A is a circuit diagram of the radiation detector 1 according to the present embodiment. FIG. 8B is a plan view illustrating the structure of pixels in the present embodiment. As illustrated in FIGS. 8A and 8B, the radiation detector 1 includes effective pixels 101 and deterioration detection pixels 102 in the irradiated region of the pixel array 103. The pixel structure of the effective pixel 101 is similar to that of the first embodiment.

The deterioration detection pixel 102 of the present embodiment has a pixel structure different from that of the first embodiment and the second embodiment. That is, a second control line 202 extending parallel to the control line 201 of the reset transistor from the vertical scanning circuit 207 is connected to the reset transistor M21 of the deterioration detection pixel 102.

The second control line 202 is provided in the same row as the row in which the first control line 201 connected to the effective pixel 101 in the pixel array 103 is provided. The second control line 202 is connected to the reset transistor M21 of the deterioration detection pixel 102, and is not connected to the reset transistor M11 of the effective pixel 101. According to this configuration, the deterioration detection pixel 102 can be driven independently from the effective pixel 101 in the same row.

The control line 201 of the resent transistor controls the signal accumulation period and driving timing of the effective pixel 101 by transferring a signal from the vertical scanning circuit 207 to the reset transistor M11 of the effective pixel 101. In contrast, the second control line 202 of the reset transistor is connected to the reset transistor M21 of the deterioration detection pixel 102. In the case of calculating the adjustment values dV1 and dV2, a signal value (high level) that causes the reset transistor M21 to be in a conducting state (reset state) is continuously input to the gate of the reset transistor M21 via the second control line 202 of the reset transistor.

That is, the present embodiment is an example of a pixel structure in which driving can be performed such that a voltage independent from the incident amount of the radiation is input to the gate of the amplification transistor M22 of the deterioration detection pixel 102.

Therefore, similarly to the configuration described with reference to FIGS. 1 and 2 in which the predetermined driving voltage VDD is input to the amplification transistor M22 via the power source voltage line 403, the threshold change of the amplification transistor can be detected on the basis of a signal of the deterioration detection pixel 102. In addition, change in the dark current level of the detection diode D11 can be detected on the basis of the signal of the effective pixel 101 and the signal of the deterioration detection pixel 102. Therefore, the resistance to the time-related deterioration caused by radiation can be improved also in the case where the pixel structure of the deterioration detection pixel 102 of the present embodiment is used. As a specific measure to address the time-related deterioration, the methods described in the first to sixth embodiments can be applied.

As a merit of the present embodiment, in the case of not obtaining the adjustment values dV1 and dV2, a control pulse (RES) similar to that of the control line 201 of the same row can be provided to the control line 202. As a result of this, the output signal from the deterioration detection pixel 102 reflects the amount of radiation incident on the detection diode D21, and the pixel signal of the deterioration detection pixel 102 can be included in the output image data of the radiation detector 1.

In other words, the second pixel of the present embodiment is configured to output a signal obtained by the second amplification transistor amplifying the signal charge accumulated in the second conversion element as a result of the same control signal as the control signal input to the first reset transistor via the first control line being input to the second reset transistor via the second control line. As described above, according to the present embodiment, the deterioration detection pixel 102 can be caused to function as a kind of an effective pixel that detects radiation.

Modification Example of Eighth Embodiment

As a modification example, the pixel structure of the deterioration detection pixel 102 may be made the same as the effective pixel 101, that is, the control line 202 may be omitted, and the pixel may be caused to function as the deterioration detection pixel 102 by control. That is, whereas the control pulse RES of the control line 201 is transmitted at a reset timing in normal imaging, the output signal of the deterioration detection pixel 102 is obtained by setting the signal value of the control line 201 to a high level all the time in an adjustment mode different from the imaging. At this time, since the reset transistor M21 is in a conducting state, the output signal is independent from the incident amount of the radiation, and is dependent on the reset potential (VRES) and the threshold voltage of the amplification transistor M22. Therefore, by comparing the output signal of the deterioration detection pixel 102 obtained in the initial state with the output signal of the deterioration detection pixel 102 obtained after the progress of the time-related deterioration, change in the threshold voltage of the amplification transistor M22 can be detected.

That is, the present modification example is an example of a configuration in which, similarly to the other embodiments, change in the threshold voltage of the first amplification transistor is detected on the basis of the difference between the output signal of the second pixel obtained when a constant voltage is applied to the control electrode of the second amplification transistor in the first state and the output signal of the second pixel obtained when the constant voltage is applied to the control electrode of the second amplification transistor in the second state that is after the first state.

To be noted, in the present modification example, since the deterioration detection pixel 102 has the same pixel structure as the effective pixel 101, a deterioration detection pixel 102 and an effective pixel 101 belonging to the same row in the pixel array 103 cannot be driven independently from each other. In contrast, if the pixel structure of the deterioration detection pixel 102 is different from the pixel structure of the effective pixel 101 as in the other embodiments, the deterioration detection pixel 102 can be driven simultaneously with normal imaging, and the adjustment values described above can be calculated on the basis of the obtained output signals.

Modification Example Common to First to Eighth Embodiments

For all the first to eighth embodiments described above, the adjustment value for adjusting the time-related deterioration may be performed in real time during the imaging period of the radiation detector 1, or may be performed in a period different from part of the imaging period as an adjustment mode. The imaging period of the radiation detector 1 is a period in which the pixel array 103 is driven to output the image data to the outside and the obtained pixel signal is processed by a peripheral circuit and output to the outside. That is, the detector may be configured to calculate the adjustment value for adjusting the detector by using the output signal of the second pixel obtained while the execution of the operation of obtaining image data using the pixel array and outputting the image data to the outside. The adjustment value may be the adjustment value dV1 used for adjusting the driving voltage VDD of the amplification transistor M12 serving as a first adjustment value, the adjustment value dV2 or dV3 used for adjusting the driving voltage VRES (reset potential) of the reset transistor M11 serving as a second adjustment value, or a different value.

Regarding the irradiation amount of the radiation, while the pixel array 103 is driven for calculating the adjustment value, a non-irradiated state (dark output) may be taken, or the pixel array 103 may be driven while irradiating the pixel array 103 with radiation of a standard amount set in advance. However, to equalize the degree of time-related deterioration between the effective pixel 101 and the deterioration detection pixel 102, it is preferable to drive the effective pixel 101 and the deterioration detection pixel 102 at the same timing regardless of whether the radiation detector 1 is in the imaging period or in the adjustment mode. In other words, it is preferable that the history of the control pulses SET and RES input via the control lines 201 (201') and 203 matches between the effective pixel 101 and the deterioration detection pixel 102 belonging to the same row except for a structurally inevitable delay or the like.

Ninth Embodiment

A ninth embodiment will be described. In the description below, it is assumed that elements denoted by the same reference signs as in the first embodiment substantially have the same configurations and effects as in the first embodiment unless otherwise described.

The present embodiment relates to the arrangement of the effective pixels 101 and the deterioration detection pixels 102 in the pixel array 103. As the pixel structures of the effective pixels 101 and the deterioration detection pixels 102, the calculation methods for the adjustment values dV1, dV2, and dV3, and the like, those described in the first to eighth embodiments can be used.

FIGS. 9A to 9F are each a plan view illustrating an arrangement example of the effective pixels 101 and the deterioration detection pixels 102. In FIGS. 9A to 9F, each small rectangle represents a pixel, and a hatched region represents a non-irradiated region 105, and a region without hatching represents an irradiated region 104. In addition, the effective pixels 101 are represented by white rectangles, and the deterioration detection pixels 102 are represented by black rectangles.

The entire region of the pixel array 103 may be set as a region irradiated with radiation, but in each illustrated example, a pixel group of outermost pixels of the pixel array 103 by a width of one pixel is set as the non-irradiated region or a shielded region that is not irradiated with the radiation. The region on the inside of the outer periphery of the pixel array 103 is a region not shielded by a shielding member, that is, an irradiated region or a non-shielded region configured such that the radiation is incident thereon. By setting the outer periphery of the pixel array 103 as a non-irradiated region, the possibility of the radiation passing through to the outside of the pixel array 103 can be reduced.

To set the non-irradiated region 105, a shielding member formed from a material that does not transmit radiation or reduces radiation such as a metal plate having an opening may be disposed to overlap the region serving as the non-irradiated region 105. For the shielding member, an appropriate material is used in accordance with the type of the energy beam that is a detection target of the detector. As described above, in the present embodiment, the deterioration detection pixels 102 are disposed in the irradiated region 104 together with the effective pixels 101. To be noted, the pixels disposed in the non-irradiated region 105 may have a pixel structure of the deterioration detection pixels 102, a pixel structure of the effective pixels 101, or a different pixel structure.

Except for a case where the deterioration detection pixels 102 are also used as effective pixels in the eighth embodiment, in the first to eighth embodiments, the output signals of the deterioration detection pixels 102 do not reflect the amount of radiation incident on the deterioration detection pixels 102. Therefore, interpolating the pixel values of the deterioration detection pixels 102 (unit cell values of second unit cells) on the basis of output signals of the effective pixels 101 around the deterioration detection pixels 102 can be considered. The interpolation of the pixel values is performed by, for example, the image processing portion 211 illustrated in FIG. 3. As a result of this, for example, the radiation detector 1 can output image data of the entirety of the irradiated region 104.

In the case where the interpolation described above is performed, a layout in which many effective pixels 101 are disposed around each deterioration detection pixel 102 is preferred for improving the precision of the interpolation. As a method of the interpolation, for example, a pixel value of an effective pixel 101 adjacent to the deterioration detection pixel 102 may be used, or a value obtained by applying a median filter or an average value filter on pixel values of a predetermined number of pixels around the deterioration detection pixel 102 may be used.

Figure 9A:
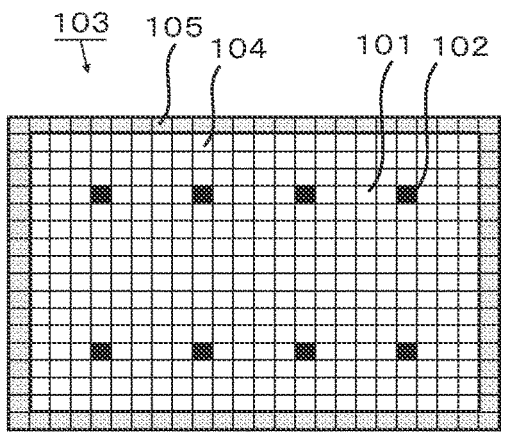
FIGS. 9A to 9F are each a diagram illustrating an arrangement layout example of deterioration detection pixels in a ninth embodiment.

In FIG. 9A, the deterioration detection pixels 102 are arranged in a disperse manner (disperse arrangement) in the irradiated region 104, and the effective pixels 101 of a predetermined number or more are disposed therearound. For example, it is preferable that all the eight pixels around each deterioration detection pixel 102 are the effective pixels 101 in the irradiated region 104. That is, the second pixel group is preferably disposed such that pixels in the second pixel group are not adjacent to each other in the pixel array 103. By uniformly dispersing the deterioration detection pixels 102 in the irradiated region 104 as described above, the precision of the adjustment can be secured, and uniform image data can be output.

Figure 9B:
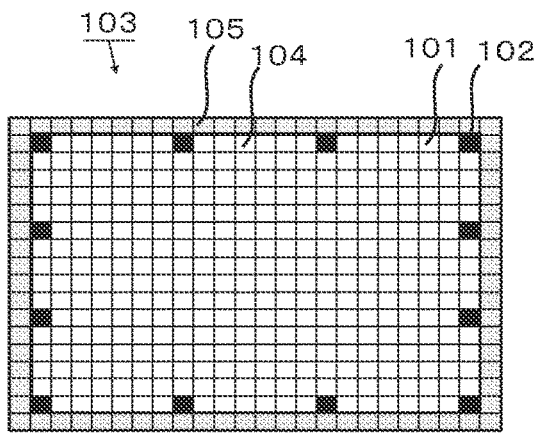

FIG. 9B illustrates a layout example in which the deterioration detection pixels 102 are provided at an outer peripheral portion of the irradiated region 104. The outer peripheral portion is, for example, a region of a predetermined width inward from the outer periphery of the irradiated region 104. The predetermined width is, for example, a width of about 5% to 10% of the smaller one of the number of rows or the number of columns of the pixel array 103. By employing such a layout, the center portion of the irradiated region 104 is fully occupied by the effective pixels 101, and therefore an image of a high precision in which interpolation of pixel values is not performed can be obtained in the vicinity of the center where the imaging target is likely to be positioned.

Figure 9C:
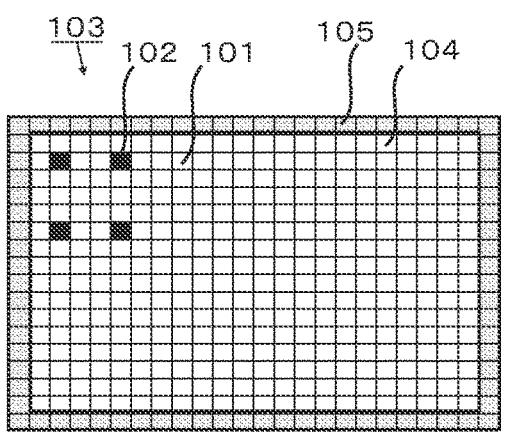

FIG. 9C illustrates a layout example in which the deterioration detection pixels 102 are concentrated in a partial region in the irradiated region 104. By employing such a layout, the effective pixels 101 can be provided in a field-of-view region where it is desired to obtain an image with high precision, and the deterioration detection pixels 102 can be provided in a different region.

Figure 9D:
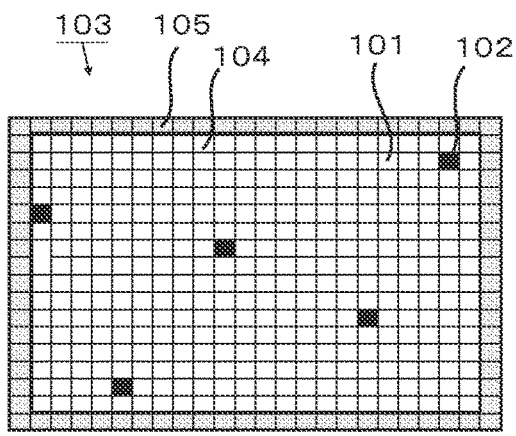

The deterioration detection pixels 102 can be also arranged randomly as illustrated in FIG. 9D. In the case of random arrangement, unnecessary signals and noises resulting from the periodicity of the deterioration detection pixels 102 can be suppressed as compared with a case where the deterioration detection pixels 102 are periodically arranged.

Figure 9E:
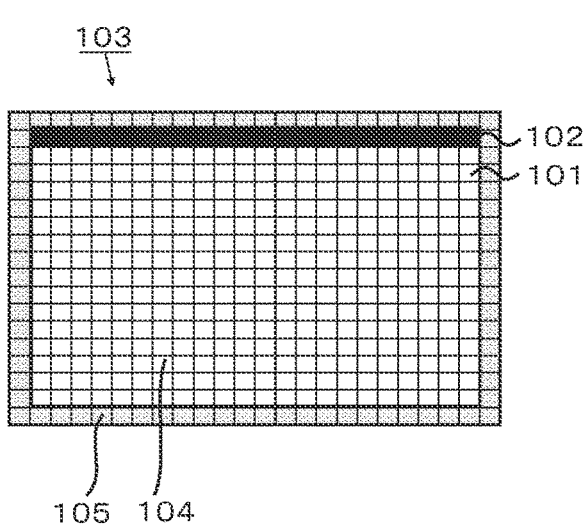
Figure 9F:
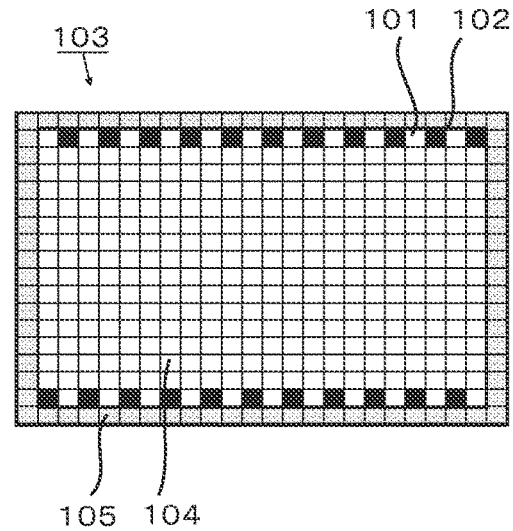

FIGS. 9E and 9F illustrate examples of layouts in which at least one deterioration detection pixel 102 is disposed for each of signal lines for transmitting pixel signals from the pixel array 103 to the column circuit portion 204. In each of FIGS. 9E and 9F, since at least one deterioration detection pixel 102 is provided for each loading channel of the pixel signals of the effective pixels 101, the noise resulting from the circuit characteristics of each channel (circuit characteristics of each column) can be reduced.

The layout of FIG. 9E is advantageous in that a wide region of the effective pixels 101 can be secured by aligning the deterioration detection pixels 102 in one row. The pixel values of the row in which the deterioration detection pixels 102 are arranged may be interpolated by using the output signals of the effective pixels 101 of a different row, or may be not included in the output image data of the radiation detector 1, that is, may be regarded as the inside of the irradiated region 104 but the outside of an effective pixel region. FIG. 9F illustrates a layout example in which the deterioration detection pixels 102 are alternately arranged in the uppermost row and the lowermost row of the irradiated region 104. The layout of FIG. 9F can reduce a noise resulting from the circuit structure in a configuration in which, for example, the column circuit portion 204 is divided into the upper side and the lower side of the pixel array 103 and signal lines on the lower side and signal lines on the upper side are alternately arranged on a column basis.

Tenth Embodiment

As a tenth embodiment, an example in which the radiation detector 1 is constituted by a transfer-type CMOS image sensor will be described by using circuit diagrams of FIGS. 10A to 10C.

Figure 10A:
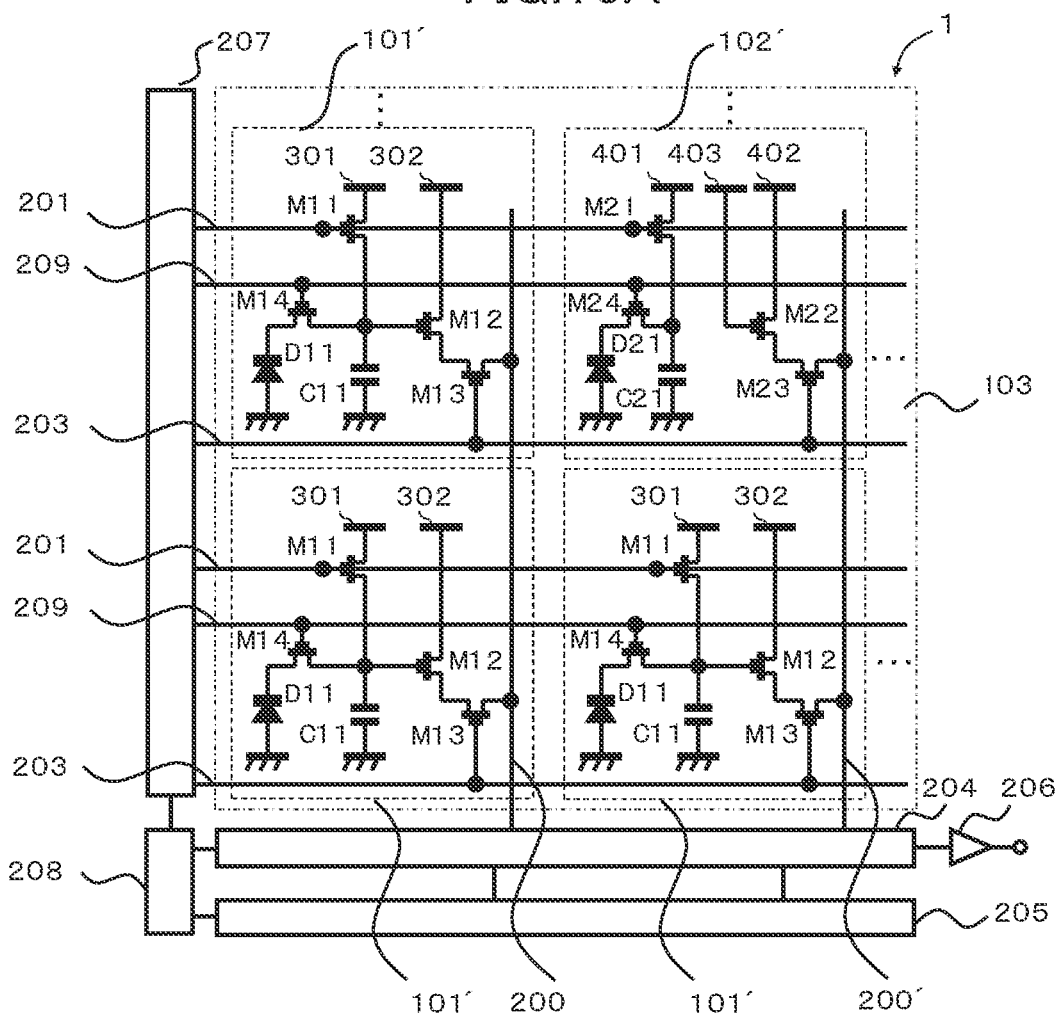
FIGS. 10A to 10C are each a circuit diagram of a detector having a pixel structure of a transfer type according to a tenth embodiment.

As illustrated in FIG. 10A, each effective pixel 101 includes a transfer transistor M14 serving as a first transfer transistor and a charge conversion portion C11 serving as a first floating diffusion capacitance portion. Each deterioration detection pixel 102 includes a transfer transistor M24 serving as a second transfer transistor and a charge conversion portion C21 serving as a second floating diffusion capacitance portion. In addition, the effective pixel 101 and the deterioration detection pixel 102 respectively include the detection diodes D11 and D21, the reset transistors M11 and M21, the amplification transistors M12 and M22, and the selection transistors M13 and M23, similarly to the first embodiment.

The transfer transistor M14 of the effective pixel 101 is provided in an electric path between the detection diode D11 and a node to which the charge conversion portion C11, the reset transistor M11, and the amplification transistor M12 are connected. Similarly, the transfer transistor M24 of the deterioration detection pixel 102 is provided in an electric path between the detection diode D21 and a node to which the charge conversion portion C21, the reset transistor M21, and the amplification transistor M22 are connected.

To the drains of the reset transistors M11 and M21, the driving voltage VRES is supplied via the first power source voltage lines 301 and 401. To the drains of the amplification transistors M12 and M22, the driving voltage VDD is supplied via the second power source voltage lines 302 and 402. The selection transistors M13 and M23 are respectively provided in electric paths between the amplification transistors M12 and M22 and the signal lines 200 and 200'. The charge conversion portions C11 and C12 include floating diffusion capacitance provided in the semiconductor substrate and parasitic capacitance of electric paths from the transfer transistors M14 and M24 to the amplification transistors M12 and M22 via the floating diffusion portions.

In the effective pixel 101, the detection diode D11 and the gate of the amplification transistor M12 are connected via the transfer transistor M14 and the charge conversion portion C11. In contrast, in the deterioration detection pixel 102, the gate of the amplification transistor M22 serving as a second amplification transistor is not connected to the charge conversion portion C21, and is insulated from the detection diode D21 serving as a second conversion element. The gate of the amplification transistor M22 is connected to the third power source voltage line 403.

As described above, the deterioration detection pixel 102 of the present embodiment has a pixel structure in which the control electrode (gate electrode) of the amplification transistor M22 is connected to a constant voltage source via the power source voltage line 403. The power source voltage line 403 is a third power supply line different from a first power supply line (power source voltage line 401) for supplying a voltage to the main electrode of the reset transistor M21 and a second power supply line (power source voltage line 402) for supplying a voltage to the main electrode of the amplification transistor M22.

That is, whereas a voltage corresponding to the incident amount of the energy beam is applied to the gate of the amplification transistor M12 in the effective pixel 101, a constant voltage independent from the incident amount of the energy beam is applied to the gate of the amplification transistor M22 in the deterioration detection pixel 102. As a result of this, the deterioration detection pixel 102 is configured to output a signal corresponding to the voltage (driving voltage of the power source voltage line 403) applied from the constant voltage source to the main electrode of the amplification transistor M22.

In addition, as another configuration of the deterioration detection pixel 102 having the pixel structure of the transfer-type CMOS image sensor, a configuration similar to that of the seventh embodiment or the eighth embodiment can be also employed.

Figure 10B:
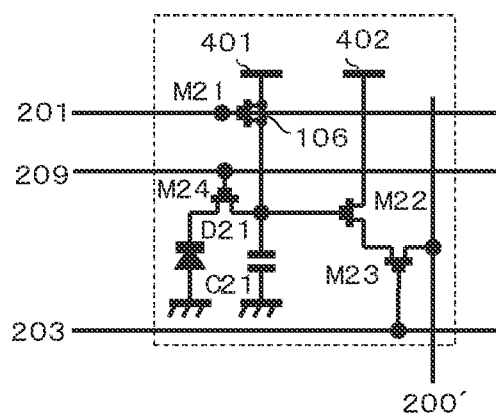

As illustrated in FIG. 10B, similarly to the seventh embodiment, the drain and source of the reset transistor M21 of the deterioration detection pixel 102 may be short-circuited. That is, in the deterioration detection pixel 102 serving as a second pixel, the reset transistor M21 includes a first main electrode connected to the constant voltage source and a second main electrode connected to the second floating diffusion capacitance portion (charge conversion portion C21). Further, in the deterioration detection pixel 102, the first main electrode and the second main electrode are short-circuited. As a result of this, the deterioration detection pixel 102 is configured to output a signal corresponding to the voltage (driving voltage of the reset transistor M21) applied from the constant voltage source to the main electrode of the amplification transistor M22.

Figure 10C:
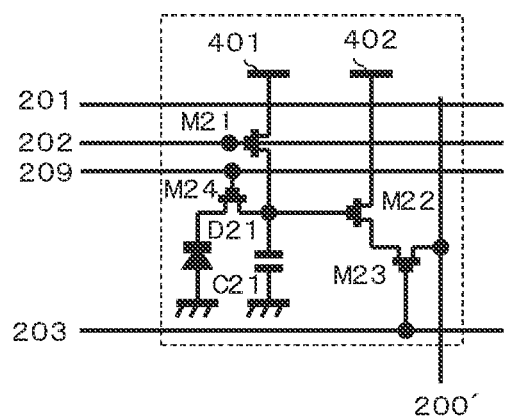

In addition, as illustrated in FIG. 10C, a control line 202 different from the control line 201 of the reset transistor M11 of the effective pixel 101 may be connected to the reset transistor M21 of the deterioration detection pixel 102 similarly to the eighth embodiment. In addition, the transfer transistor M14 may be configured to be always in an OFF state.

According to these configurations, even in a pixel structure of a transfer type in which generation of a noise can be suppressed by a charge transfer operation, the threshold change of the transistor or the like can be detected by the deterioration detection pixel 102, and the resistance to the time-related deterioration caused by radiation can be improved.

Eleventh Embodiment

In the first to tenth embodiments described above, configuration examples of a detector have been described. In the present embodiment, a radiation imaging system serving as an example of a detection system including a detector will be described.

Figure 11:
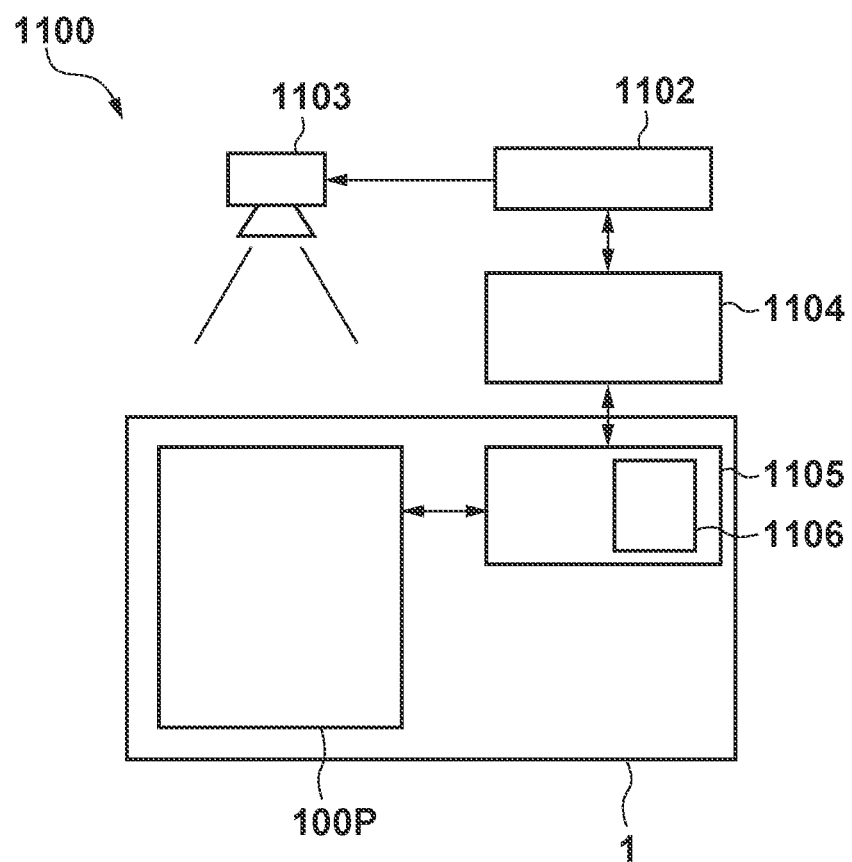
FIG. 11 is a diagram illustrating a system according to an eleventh embodiment.

A radiation imaging system 1100 illustrated in FIG. 11 is a detection system including an image pickup portion 1101 serving as a radiation detector, an irradiation controller 1102, a radiation source 1103 serving as an irradiation portion of an energy beam, and a computer 1104. The image pickup portion 1101 includes an image pickup panel 100P including a pixel array. As a configuration of the image pickup portion 1101, any of those described in the first to tenth embodiment may be used.

The radiation source 1103 starts radiation of a radioactive ray in accordance with an irradiation command from the irradiation controller 1102. The radioactive ray radiated from the radiation source 1103 is transmitted through an imaging target (sample) and is incident on the image pickup panel 100P of the image pickup portion 1101. The radiation source 1103 stops radiation of the radioactive ray in accordance with a stop command from the irradiation controller 1102.

The image pickup portion 1101 is, for example, a flat panel detector used for radiographing in medical image diagnosis or non-destructive inspection. The image pickup panel 100P of the image pickup portion 1101 can be formed in a plate shape of a size matching the size of the imaging target. For example, in the image pickup panel 100P, 3300× 2800 pixels are arranged on a substrate of 550 mm×445 mm.

The image pickup portion 1101 may have a configuration of a direct conversion type in which the radiation is converted into a signal charge by a detection diode provided in the pixel array of the image pickup panel 100P. In addition, the image pickup portion 1101 may have a configuration of an indirect conversion type in which the radiation is converted into fluorescent light by a scintillator layer provided on an upper layer of the pixel array of the image pickup panel 100P and the fluorescent light is converted into a signal charge by the detection diode of the pixel array.

The image pickup portion 1101 includes the image pickup panel 100P described above, a controller 1105 for controlling the image pickup panel 100P, and a signal processing portion 1106 for processing signals output from the image pickup panel 100P. The signal processing portion 1106 may, for example, A/D-convert a signal output from the image pickup panel 100P and output the converted signal to the computer 1104 as digital image data. In addition, for example, the signal processing portion 1106 may generate a stop signal for stopping the radiation of the radioactive ray from the radiation source 1103 on the basis of a signal output from the image pickup panel 100P. The stop signal is supplied to the irradiation controller 1102 via the computer 1104, and the irradiation controller 1102 transmits a stop command to the radiation source 1103 in response to the stop signal.

The controller 1105 can be constituted by, for example, a programmable logic device: PLD such as a field programmable gate array: FPGA, an application specific integrated circuit: ASIC, a general-purpose computer in which a program is incorporated, or a combination of all or some of these.

Although the signal processing portion 1106 is illustrated as being disposed in the controller 1105 or being a partial function of the controller 1105 in the present embodiment, the configuration is not limited to this. The controller 1105 and the signal processing portion 1106 may be separate elements. Further, the signal processing portion 1106 may be disposed separately from the image pickup portion 1101. For example, the computer 1104 may have a function of the signal processing portion 1106. Therefore, the signal processing portion 1106 can be included in the radiation imaging system 1100 as a signal processing apparatus that processes a signal output from the image pickup portion 1101.

The computer 1104 can perform control of the image pickup portion 1101 and the irradiation controller 1102, and processing for receiving radiation image data from the image pickup portion 1101 and displaying the radiation image data as a radiation image. In addition, the computer 1104 can function as an input portion for the user to input conditions for capturing a radiation image.

For example, the irradiation controller 1102 includes an irradiation switch, and when the irradiation switch is turned on by the user, an irradiation command is transmitted to the radiation source 1103, and a start notification indicating the start of the radiation of a radioactive ray is transmitted to the computer 1104. The computer 1104 having received the start notification notifies the start of the radiation of the radioactive ray to the controller 1105 of the image pickup portion 1101 in response to the start notification. In accordance with this, the controller 1105 generates a signal corresponding to the incident radiation in the image pickup panel 100P.

Twelfth Embodiment

Figure 12A:
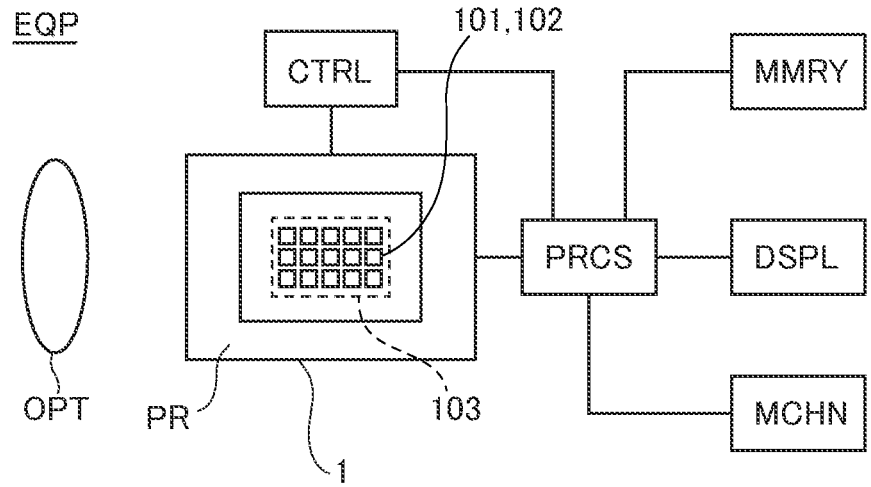
FIGS. 12A and 12B are each a diagram illustrating a system according to a twelfth embodiment.

In the present embodiment, another example of a detection system including a detector will be described. FIG. 12A illustrates equipment EQP serving as a detection system including the radiation detector 1.

The radiation detector 1 includes the pixel array 103 in which pixels are arranged in a matrix and a peripheral region PR therearound. In the peripheral region PR, peripheral circuits such as a vertical scanning circuit and a column circuit portion can be provided.

The equipment EQP can further include at least one of an optical system OPT, a control apparatus CTRL, a processing apparatus PRCS, a display apparatus DSPL, a storage apparatus MMRY, and a machine apparatus MCHN. The optical system OPT focuses the radiation on the radiation detector 1, and examples thereof include lenses, shutters, and mirrors. Depending on the type of the used radiation, for example, the optical system OPT may focus a particle beam such as an electron beam or a proton beam on the radiation detector 1. The control apparatus CTRL controls the radiation detector 1, and examples thereof include an ASIC. The processing apparatus PRCS processes a signal output from the radiation detector 1, and is a device such as a central processing unit: CPU or an ASIC for constituting an analog front end: AFE or a digital front end: DFE. The display apparatus DSPL is an electroluminescence display apparatus: EL display apparatus or a liquid crystal display apparatus that displays information obtained by the radiation detector 1 in a form such as a visible image. The storage apparatus MMRY is a magnetic device or a semiconductor device that stores the information obtained by the radiation detector 1. The storage apparatus MMRY is a volatile memory such as a static random access memory: SRAM or a dynamic random access memory: DRAM, or a nonvolatile memory such as a flash memory or a hard disk drive. The machine apparatus MCHN includes a movable portion or a propelling portion such as a motor or an engine.

The equipment EQP displays the signal output from the radiation detector 1 on the display apparatus DSPL, or transmits the signal to the outside by an unillustrated communication apparatus that the equipment EQP includes. Therefore, the equipment EQP preferably further includes the storage apparatus MMRY and the processing apparatus PRCS in addition to the storage circuit and the calculation circuit that the radiation detector 1 includes. The machine apparatus MCHN may be controlled on the basis of the signal output from the radiation detector 1.

The equipment EQP illustrated in FIG. 12A may be medical equipment such as an endoscope or radiation diagnosis equipment, measurement equipment such as a distance measurement sensor, or analysis equipment such as an electron microscope.

Figure 12B:
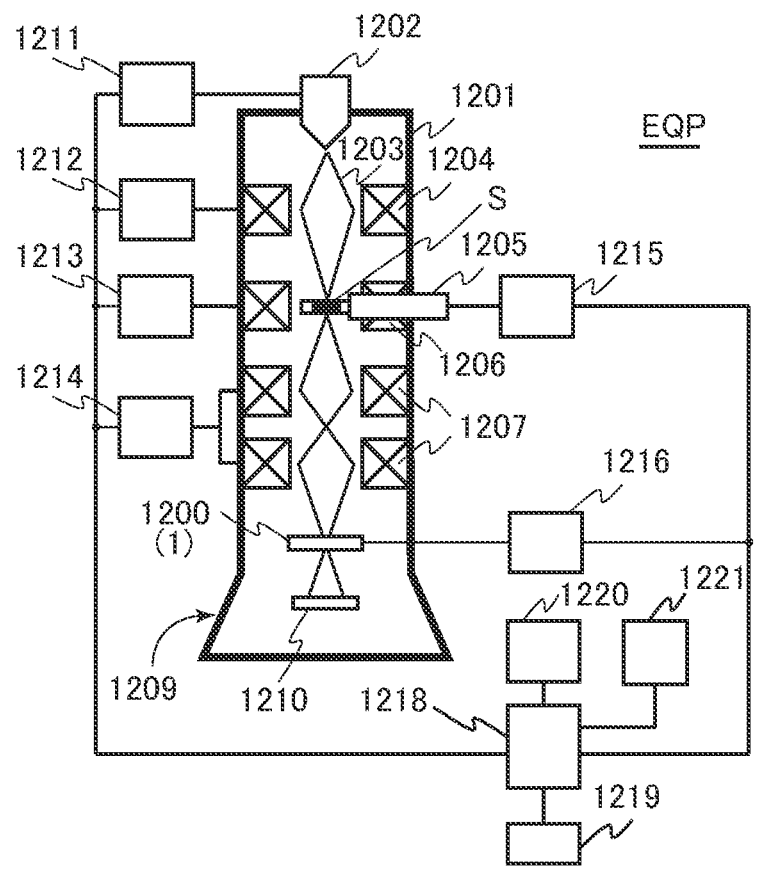

FIG. 12B is a schematic diagram illustrating a configuration of a transmission electron microscope: TEM as an example of the equipment EQP. The equipment EQP as an electron microscope includes an electron beam source 1202 (electron gun) serving as an irradiation portion of an energy beam (electron beam), an irradiation lens 1204, a vacuum chamber 1201 (lens barrel), an objective lens 1206, and a magnifying lens system 1207. In addition, the equipment EQP includes a camera 1209 serving as an image pickup portion. The camera 1209 includes a direct radiation detector 1200 as the radiation detector 1 of a direct detection type.

An electron beam 1203 that is an energy beam emitted from the electron beam source 1202 is converged by the irradiation lens 1204, and irradiates a sample S held by a sample holder and serving as an analysis target. The space that the electron beam 1203 passes through is defined by the vacuum chamber 1201 (lens barrel), and this space is maintained in a vacuum. The radiation detector 1 is disposed to face the vacuum space that the electron beam 1203 passes through. The electron beam 1203 having passed through the sample S is magnified by the objective lens 1206 and the magnifying lens system 1207, and is projected onto the radiation detector 1. The electron optical system for irradiating the sample S with an electron beam will be referred to as an irradiation optical system, and an electron optical system for focusing the electron beam having passed through the sample S on the radiation detector 1 will be referred to as a focusing optical system.

The electron beam source 1202 is controlled by an electron beam source control apparatus 1211. The irradiation lens 1204 is controlled by an irradiation lens control apparatus 1212. The objective lens 1206 is controlled by an objective lens control apparatus 1213. The magnifying lens system 1207 is controlled by a magnifying lens system control apparatus 1214. A control mechanism 1205 for the sample holder is controlled by a holder control apparatus 1215 that controls the driving mechanism of the sample holder.

The electron beam 1203 having passed through the sample S is detected by the direct radiation detector 1200 of the camera 1209. The output signal from the direct radiation detector 1200 is processed by a signal processing apparatus 1216 and an image processing apparatus 1218 each serving as the processing apparatus PRCS, and thus an image signal is generated. The generated image signal (transmission electron image) is displayed on an image display monitor 1220 and an analysis monitor 1221 each serving as the display apparatus DSPL.

The camera 1209 is provided in a lower portion of the equipment EQP. The camera 1209 includes the direct radiation detector 1200 that is a direct electron detector. The direct radiation detector 1200 corresponds to the image pickup element 100. At least part of the camera 1209 is provided in the camera 1209 so as to be exposed to the vacuum space defined by the vacuum chamber 1201.

The electron beam source control apparatus 1211, the irradiation lens control apparatus 1212, the objective lens control apparatus 1213, the magnifying lens system control apparatus 1214, and the holder control apparatus 1215 are each connected to the image processing apparatus 1218. As a result of this, mutual communication of data can be performed for setting the imaging conditions of the electron microscope. For example, the irradiation rate of the electron beam can be set to 0.5 electron/pix/frm or less. In this case, the electron beam source control apparatus 1211 and the image processing apparatus 1218 each function as a controller that controls the irradiation rate of the radiation. Driving control of the sample holder and setting of observation conditions of each lens can be performed by using the signal from the image processing apparatus 1218.

The operator prepares the sample S serving as an imaging target, and sets the imaging conditions by using an input apparatus 1219 connected to the image processing apparatus 1218. Predetermined data is input to each of the electron beam source control apparatus 1211, the irradiation lens control apparatus 1212, the objective lens control apparatus 1213, and the magnifying lens system control apparatus 1214 such that desired acceleration voltage, magnification, and observation mode can be obtained. In addition, the operator inputs conditions such as the number of successive field-of-view images, imaging start position, and movement speed of the sample holder to the image processing apparatus 1218 by using the input apparatus 1219 such as a mouse, keyboard, and touch panel. A configuration in which the image processing apparatus 1218 automatically sets the conditions without input from the operator may be employed.

The detection systems described above in the eleventh and twelfth embodiments are merely examples, and the detectors described in the first to tenth embodiments may be applied to a different detection system.

OTHER EXAMPLES

In the first to tenth embodiments described above, configurations of a direct conversion type in which the incident radiation is directly converted into an electric signal by a conversion element such as a detection diode has been described as the radiation detector 1. The configuration is not limited to this, and the radiation detector may have a configuration of an indirect conversion type in which the incident radiation is converted into fluorescent light by a scintillator and the fluorescent light is converted into an electric signal by a photoelectric conversion element.

In addition, although cases where radiation is assumed as an energy beam for the radiation detector have been described in the first to tenth embodiments, the technique of the present disclosure is also applicable to a photodetector that uses light (electromagnetic wave different from ionizing radiation, such as visible light or infrared light) as the energy beam.

In the case of the photodetector, irradiation with light during imaging does not directly cause time-related deterioration resulting from radiation, but time-related deterioration caused by environmental radiation is inevitable. As a specific example, the technique of the present disclosure can be preferably applied to a photodetector incorporated in an apparatus used in an environment exposed to a relatively high dosage of radiation such as a surveillance camera, work robot, or drone used in a nuclear power plant, a camera incorporated in an artificial satellite, or the like.

As described above, according to the present disclosure, a detector and a detection system that can improve the resistance against time-related deterioration caused by radiation can be provided.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2022-134559, filed on Aug. 26, 2022, and 2023-080760, filed on May 16, 2023, which are hereby incorporated by reference herein in their entirety.

What is claimed is:

1. A detector comprising:
a unit cell array in which a plurality of unit cells are arranged,
wherein the plurality of unit cells include:
a first unit cell including a first conversion element configured to convert an incident energy beam into a signal charge and accumulate the signal charge, and a first amplification transistor including a control electrode connected to the first conversion element, the first unit cell being configured to output a signal obtained by amplifying the signal charge by the first amplification transistor, and
a second unit cell including a second conversion element configured to convert the incident energy beam into an electric charge and accumulate the electric charge, a reset transistor configured to reset the electric charge accumulated in the second conversion element, and a second amplification transistor including a control electrode connected to a constant voltage source, the second unit cell being configured to output a signal corresponding to a voltage of the constant voltage source by the second amplification transistor,
wherein the first unit cell and the second unit cell are disposed in an irradiated region in the unit cell array, the irradiated region being configured to be irradiated with the energy beam, and
wherein the detector further comprises:
a first power supply line configured to supply a voltage to a main electrode of the reset transistor;
a second power supply line configured to supply a voltage to a main electrode of the second amplification transistor; and
a third power supply line configured to supply the voltage from the constant voltage source to the control electrode of the second amplification transistor.

2. The detector according to claim 1, wherein the second conversion element is insulated from the second amplification transistor.

3. The detector according to claim 1, further comprising:
a detection portion configured to detect change in a threshold voltage of the first amplification transistor on a basis of a difference between (i) an output signal of the second unit cell in a first state and (ii) an output signal of the second unit cell in a second state that is after the first state.

4. The detector according to claim 1, further comprising:
a first adjustment portion configured to adjust a voltage applied to a main electrode of the first amplification transistor, on a basis of a difference between (i) an output signal of the second unit cell in a first state and (ii) an output signal of the second unit cell in a second state that is after the first state.

5. The detector according to claim 1, further comprising:
a second adjustment portion configured to adjust a reset potential for resetting a potential of the control electrode of the first amplification transistor, on a basis of a difference between (i) an output signal of the second unit cell in a first state and (ii) an output signal of the second unit cell in a second state that is after the first state.

6. The detector according to claim 1, further comprising:
a third adjustment portion configured to adjust both of a voltage applied to a main electrode of the first amplification transistor and a reset potential for resetting a potential of the control electrode of the first amplification transistor, on a basis of a difference between (i) an output signal of the second unit cell in a first state and (ii) an output signal of the second unit cell in a second state that is after the first state.

7. The detector according to claim 1, further comprising:
a fourth adjustment portion configured to adjust a reset potential for resetting a potential of the control electrode of the first amplification transistor, on a basis of a difference between an output signal of the first unit cell and an output signal of the second unit cell each obtained in a state of not being irradiated with the energy beam.

8. The detector according to claim 1, further comprising:
an amplification portion configured to amplify an output signal of a unit cell of the unit cell array,
wherein the amplification portion adjusts a gain for amplifying an output signal of the first unit cell in a case where at least one of a voltage applied to a main electrode of the first amplification transistor and a reset potential for resetting a potential of the control electrode of the first amplification transistor is adjusted by using an output signal of the second unit cell.

9. The detector according to claim 1, wherein the detector is configured to
(a) in a case of outputting image data based on an output signal of the first unit cell, obtain the output signal of the first unit cell at a first frame rate, and
(b) in a case of adjusting the detector by using an output signal of the second unit cell, obtain the output signal of the first unit cell and the output signal of the second unit cell at a second frame rate different from the first frame rate in a state in which the energy beam is not incident, and adjust a reset potential on a basis of a ratio between the first frame rate and the second frame rate and a difference between the output signal of the first unit cell and the output signal of the second unit cell that have been obtained, the reset potential being used for resetting a potential of the control electrode of the first amplification transistor.

10. The detector according to claim 1, further comprising:
a vertical scanning circuit configured to drive the unit cells in the unit cell array on a row basis,
wherein the vertical scanning circuit is configured to drive the first unit cell and the second unit cell that are in the same row of the unit cell array at the same timing.

11. The detector according to claim 1, wherein the detector is configured to calculate an adjustment value by using an output signal of the second unit cell obtained while an operation of obtaining image data by using the unit cell array and outputting the obtained image data to an outside is executed, the adjustment value being used for adjusting the detector.

12. The detector according to claim 1,
wherein the unit cell array includes a first unit cell group and a second unit cell group in the irradiated region,
wherein the first unit cell group includes a plurality of unit cells each having the same unit cell structure as the first unit cell, and
wherein the second unit cell group includes a plurality of unit cells each having the same unit cell structure as the second unit cell.

13. The detector according to claim 12, wherein the detector is configured to output image data in which a unit cell value of each unit cell in the second unit cell group is interpolated by using an output signal of a unit cell in the first unit cell group adjacent to the unit cell in the second unit cell group.

14. The detector according to claim 13, wherein the second unit cell group is disposed such that the plurality of unit cells in the second unit cell group are not adjacent to each other in the unit cell array.

15. The detector according to claim 12, further comprising:
signal lines provided for respective columns of the unit cell array; and
a column circuit portion configured to receive output signals of the unit cells in the unit cell array on a column basis via the signal lines,
wherein each column of the unit cell array includes at least one unit cell of the second unit cell group.

16. The detector according to claim 12, wherein the second unit cell group is disposed in an outer peripheral portion of the irradiated region of the unit cell array.

17. The detector according to claim 1, further comprising:
a shielding member configured to shield the energy beam,
wherein the irradiated region is a region that is not shielded by the shielding member.

18. The detector according to claim 1, wherein the first amplification transistor and the second amplification transistor are each a field effect transistor having an insulating film in a gate region thereof.

19. The detector according to claim 1,
wherein the energy beam is a radioactive ray, and
wherein the first conversion element is an element configured to directly convert the radioactive ray into a signal charge.

20. The detector according to claim 1,
wherein the energy beam is a radioactive ray,
wherein the detector further comprises a scintillator configured to emit fluorescent light in response to the radioactive ray incident thereon, and
wherein the first conversion element is an element configured to convert the fluorescent light into a signal charge.

21. The detector according to claim 1,
wherein the energy beam is light, and
wherein the first conversion element is an element configured to convert the light into a signal charge.

22. A detection system comprising:
an irradiation portion configured to irradiate a target with an energy beam, and
the detector according to claim 1 configured to detect an image of the energy beam generated by the irradiation with the energy beam.

23. A detector comprising:
a unit cell array in which a plurality of unit cells are arranged,
wherein the plurality of unit cells include:
a first unit cell including a first conversion element configured to convert an incident energy beam into a signal charge and accumulate the signal charge, and a first amplification transistor including a control electrode connected to the first conversion element, the first unit cell being configured to output a signal obtained by amplifying the signal charge by the first amplification transistor, and
a second unit cell including a second conversion element configured to convert the incident energy beam into an electric charge and accumulate the electric charge, a reset transistor configured to reset the electric charge accumulated in the second conversion element, and a second amplification transistor including a control electrode connected to a constant voltage source, the second unit cell being configured to output a signal corresponding to a voltage of the constant voltage source by the second amplification transistor,
wherein the first unit cell and the second unit cell are disposed in an irradiated region in the unit cell array, the irradiated region being configured to be irradiated with the energy beam,
wherein the reset transistor includes a first main electrode connected to the constant voltage source and a second main electrode connected to the control electrode of the second amplification transistor, and
wherein the first main electrode and the second main electrode are short-circuited.

24. A detector comprising:
a unit cell array in which a plurality of unit cells are arranged,
wherein the plurality of unit cells include:
a first unit cell including a first conversion element configured to convert an incident energy beam into a signal charge and accumulate the signal charge, a first floating diffusion capacitance portion configured to hold an electric charge, a first transfer transistor configured to transfer the electric charge accumulated in the first conversion element to the first floating diffusion capacitance portion, and a first amplification transistor including a control electrode connected to the first conversion element, the first unit cell being configured to output a signal obtained by amplifying the signal charge by the first amplification transistor, and
a second unit cell including a second conversion element configured to convert the incident energy beam into an electric charge and accumulate the electric charge, a second floating diffusion capacitance portion configured to hold an electric charge, a second transfer transistor configured to transfer the electric charge accumulated in the second conversion element to the second floating diffusion capacitance portion, a reset transistor configured to reset a potential of the second floating diffusion capacitance portion, and a second amplification transistor including a control electrode connected to a constant voltage source, the second unit cell being configured to output a signal corresponding to a voltage of the constant voltage source by the second amplification transistor,
wherein the first unit cell and the second unit cell are disposed in an irradiated region in the unit cell array, the irradiated region being configured to be irradiated with the energy beam, and
wherein the detector further comprises:
a first power supply line configured to supply a voltage to a main electrode of the reset transistor;
a second power supply line configured to supply a voltage to a main electrode of the second amplification transistor; and
a third power supply line configured to supply the voltage from the constant voltage source to the control electrode of the second amplification transistor.

25. The detector according to claim 24, wherein the second floating diffusion capacitance portion is insulated from the second amplification transistor.

26. A detector comprising:
a unit cell array in which a plurality of unit cells are arranged,
wherein the plurality of unit cells include:
- a first unit cell including a first conversion element configured to convert an incident energy beam into a signal charge and accumulate the signal charge, a first floating diffusion capacitance portion configured to hold an electric charge, a first transfer transistor configured to transfer the electric charge accumulated in the first conversion element to the first floating diffusion capacitance portion, and a first amplification transistor including a control electrode connected to the first conversion element, the first unit cell being configured to output a signal obtained by amplifying the signal charge by the first amplification transistor, and
- a second unit cell including a second conversion element configured to convert the incident energy beam into an electric charge and accumulate the electric charge, a second floating diffusion capacitance portion configured to hold an electric charge, a second transfer transistor configured to transfer the electric charge accumulated in the second conversion element to the second floating diffusion capacitance portion, a reset transistor configured to reset a potential of the second floating diffusion capacitance portion, and a second amplification transistor including a control electrode connected to a constant voltage source, the second unit cell being configured to output a signal corresponding to a voltage of the constant voltage source by the second amplification transistor,
wherein the first unit cell and the second unit cell are disposed in an irradiated region in the unit cell array, the irradiated region being configured to be irradiated with the energy beam,
wherein the reset transistor includes a first main electrode connected to the constant voltage source and a second main electrode connected to the second floating diffusion capacitance portion, and
wherein the first main electrode and the second main electrode are short-circuited.

27. A detector comprising:
a unit cell array in which a plurality of unit cells are arranged,
wherein the plurality of unit cells include;
- a first unit cell including a first conversion element configured to convert an incident energy beam into a signal charge and accumulate the signal charge, and a first amplification transistor including a control electrode connected to the first conversion element, the first unit cell being configured to output a signal obtained by amplifying the signal charge by the first amplification transistor, and
- a second unit cell including a second amplification transistor and configured to output a signal corresponding to a voltage applied to a control electrode of the second amplification transistor,
wherein the first unit cell and the second unit cell are disposed in an irradiated region in the unit cell array, the irradiated region being configured to be irradiated with the energy beam, and
wherein the detector is configured to detect change in a threshold voltage of the first amplification transistor on a basis of a difference between (i) an output signal of the second unit cell in a case where a constant voltage is applied to the control electrode of the second amplification transistor in a first state and (ii) an output signal of the second unit cell in a case where the constant voltage is applied to the control electrode of the second amplification transistor in a second state that is after the first state.

* * * * *